United States Patent
Leverson et al.

(10) Patent No.: US 9,856,415 B1
(45) Date of Patent: Jan. 2, 2018

(54) HYDRAULIC FRACTURE COMPOSITION AND METHOD

(71) Applicant: Superior Silica Sands, LLC, Ft. Worth, TX (US)

(72) Inventors: Ryan Leverson, Bloomer, WI (US); Calder Hendrickson, Lubbock, TX (US); Tommy K. Thrash, Lubbock, TX (US)

(73) Assignee: Superior Silica Sands, LLC, Ft. Worth, TX (US)

( * ) Notice: Subject to any disclaimer, the term of this patent is extended or adjusted under 35 U.S.C. 154(b) by 0 days.

(21) Appl. No.: 15/011,111

(22) Filed: Jan. 29, 2016

Related U.S. Application Data

(63) Continuation-in-part of application No. 14/171,920, filed on Feb. 4, 2014, which is a continuation of application No. 13/418,227, filed on Mar. 12, 2012, now Pat. No. 9,057,014, which is a continuation-in-part of application No. 13/299,288, filed on Nov. 17, 2011, now Pat. No. 8,661,729, which is a continuation-in-part of application No. 12/789,177, filed on May 27, 2010, now Pat. No. 8,341,881, which is a continuation of application No.
(Continued)

(51) Int. Cl.
*C09K 8/80* (2006.01)
*C09K 8/64* (2006.01)

(52) U.S. Cl.
CPC .............. *C09K 8/805* (2013.01); *C09K 8/64* (2013.01)

(58) Field of Classification Search
None
See application file for complete search history.

(56) References Cited

U.S. PATENT DOCUMENTS

| | | | |
|---|---|---|---|
| 2,690,388 | A | 9/1954 | Hale |
| 2,765,291 | A | 10/1956 | Horne |
| 2,967,789 | A | 1/1961 | Hoyt |

(Continued)

FOREIGN PATENT DOCUMENTS

| | | |
|---|---|---|
| DE | 4224368 A1 | 1/1994 |
| DE | 19936028 A1 | 2/2001 |

(Continued)

OTHER PUBLICATIONS

Drill & Fill Manufacturing. Turf Tractor Specifications. http://www.drillandfillmfg.com/tractor.html. Accessed May 27, 2008.

(Continued)

*Primary Examiner* — Jeffrey Washville
(74) *Attorney, Agent, or Firm* — Shook, Hardy & Bacon L.L.P.

(57) ABSTRACT

A method for improving the performance of fracturing processes in oil production fields may rely on polymer coated particles carried in the fracturing fluid. The particles may include heavy substrates, such as sand, ceramic sand, or the like coated with polymers selected to absorb water, increasing the area and volume to travel more readily with the flow of fluid without settling out, or allowing the substrate to settle out. Ultimately, the substrate may become lodged in the fissures formed by the pressure or hydraulic fracturing, resulting in propping open of the fissures for improved productivity.

15 Claims, 9 Drawing Sheets

Related U.S. Application Data

12/324,608, filed on Nov. 26, 2008, now Pat. No. 7,726,070.

(60) Provisional application No. 61/012,912, filed on Dec. 11, 2007.

(56) References Cited

U.S. PATENT DOCUMENTS

| | | |
|---|---|---|
| 2,991,267 A | 7/1961 | Bean |
| 3,336,129 A | 8/1967 | Herrett et al. |
| 3,336,979 A | 8/1967 | Ingraham et al. |
| 3,353,601 A | 11/1967 | Dollarhide et al. |
| 3,442,803 A | 5/1969 | Hoover et al. |
| 3,648,631 A | 3/1972 | Fiedler et al. |
| 3,705,467 A | 12/1972 | McKnight |
| 3,752,233 A | 8/1973 | Knight |
| 3,768,565 A | 10/1973 | Persinski et al. |
| 3,841,402 A | 10/1974 | Knight et al. |
| 3,868,328 A | 2/1975 | Boothe et al. |
| 3,943,060 A | 3/1976 | Martin et al. |
| 3,973,355 A | 8/1976 | McKenzie |
| 4,104,824 A | 8/1978 | Lundberg et al. |
| 4,172,066 A | 10/1979 | Lamphere et al. |
| 4,187,803 A | 2/1980 | Valenta et al. |
| 4,195,010 A | 3/1980 | McClinton et al. |
| 4,247,331 A | 1/1981 | Hamlin et al. |
| 4,272,417 A | 6/1981 | Barke et al. |
| 4,473,689 A | 9/1984 | Login et al. |
| 4,540,427 A | 9/1985 | Helbling |
| 4,579,578 A | 4/1986 | Cooke |
| 4,762,545 A | 8/1988 | Youssef et al. |
| 4,829,100 A | 5/1989 | Murphey et al. |
| 4,942,186 A | 7/1990 | Murphey et al. |
| 5,013,349 A | 5/1991 | Tanaka |
| 5,093,130 A | 3/1992 | Fujii et al. |
| 5,128,390 A | 7/1992 | Murphey et al. |
| 5,394,812 A | 3/1995 | Dunning et al. |
| 5,420,174 A | 5/1995 | Dewprashad |
| 5,450,985 A | 9/1995 | Meuleman |
| 5,501,274 A | 3/1996 | Nguyen et al. |
| 5,554,446 A | 9/1996 | Minder et al. |
| 5,633,220 A | 5/1997 | Cawiezel et al. |
| 5,794,550 A | 8/1998 | Chadwick |
| 5,806,593 A | 9/1998 | Surles |
| 5,921,317 A | 7/1999 | Dewprashad et al. |
| 5,951,978 A | 9/1999 | Red'kina et al. |
| 5,981,446 A | 11/1999 | Qiu Xiaoping et al. |
| 6,076,299 A | 6/2000 | Spittle et al. |
| 6,169,058 B1 | 1/2001 | Le et al. |
| 6,329,319 B1 | 12/2001 | Puglisi et al. |
| 6,395,051 B1 | 5/2002 | Arnold et al. |
| 6,454,003 B1 | 9/2002 | Chang et al. |
| 6,528,157 B1 | 3/2003 | Hussain et al. |
| 6,669,752 B2 | 12/2003 | Arnold et al. |
| 6,703,469 B2 | 3/2004 | Sanders et al. |
| 6,710,019 B1 | 3/2004 | Sawdon et al. |
| 6,729,402 B2 | 5/2004 | Chang et al. |
| 6,884,754 B1 | 4/2005 | Schlatter et al. |
| 6,984,705 B2 | 1/2006 | Chang et al. |
| 7,135,231 B1 | 11/2006 | Sinclair et al. |
| 7,156,194 B2 | 1/2007 | Nguyen |
| 7,216,705 B2 | 5/2007 | Saini et al. |
| 7,244,492 B2 | 7/2007 | Sinclair et al. |
| 7,334,640 B2 | 2/2008 | Hanes, Jr. et al. |
| 7,504,445 B2 | 3/2009 | Collin |
| 7,510,656 B2 | 3/2009 | Shafer et al. |
| 7,527,736 B2 | 5/2009 | Shafer et al. |
| 7,595,280 B2 | 9/2009 | Welton et al. |
| 7,628,919 B2 | 12/2009 | Shafer et al. |
| 7,635,404 B1 | 12/2009 | Devic et al. |
| 7,722,770 B2 | 5/2010 | Shafer et al. |
| 7,726,070 B2 | 6/2010 | Thrash |
| 7,814,980 B2 | 10/2010 | Bryant et al. |
| 7,819,192 B2 | 10/2010 | Weaver et al. |
| 7,888,297 B2 | 2/2011 | Hanes, Jr. et al. |
| 7,897,546 B2 | 3/2011 | Showalter et al. |
| 7,989,391 B2 | 8/2011 | Tang et al. |
| 8,082,994 B2 | 12/2011 | Nguyen et al. |
| 8,196,346 B2 | 6/2012 | Thrash |
| 8,341,881 B2 | 1/2013 | Thrash |
| 8,354,360 B2 | 1/2013 | Phatak |
| 8,453,377 B2 | 6/2013 | Thrash et al. |
| 8,510,986 B2 | 8/2013 | Thrash |
| 8,579,028 B2 | 11/2013 | Nguyen et al. |
| 8,739,464 B2 | 6/2014 | Thrash |
| 8,881,453 B2 | 11/2014 | Hendrickson et al. |
| 8,931,209 B2 | 1/2015 | Hendrickson et al. |
| 8,931,210 B2 | 1/2015 | Thrash |
| 9,174,885 B2 | 11/2015 | Taulbee |
| 2001/0001312 A1 | 5/2001 | Mitchell et al. |
| 2001/0002386 A1 | 5/2001 | Steele et al. |
| 2002/0048676 A1 | 4/2002 | McDaniel et al. |
| 2002/0049291 A1 | 4/2002 | Sanders et al. |
| 2003/0046865 A1 | 3/2003 | Nishiyama |
| 2004/0011102 A1 | 1/2004 | Sears |
| 2004/0023809 A1 | 2/2004 | Wertz et al. |
| 2004/0023818 A1 | 2/2004 | Nguyen et al. |
| 2004/0045712 A1 | 3/2004 | Eoff et al. |
| 2004/0049980 A1 | 3/2004 | Principe et al. |
| 2004/0069031 A1 | 4/2004 | Krysiak et al. |
| 2004/0069032 A1 | 4/2004 | Krysiak et al. |
| 2004/0074271 A1 | 4/2004 | Krysiak et al. |
| 2004/0236295 A1 | 11/2004 | Muthiah et al. |
| 2004/0244978 A1 | 12/2004 | Shaarpour |
| 2005/0005869 A1 | 1/2005 | Fritter et al. |
| 2005/0016732 A1 | 1/2005 | Brannon et al. |
| 2005/0019574 A1 | 1/2005 | McCrary |
| 2005/0033256 A1 | 2/2005 | Schmidt et al. |
| 2005/0069566 A1 | 3/2005 | Tamarkin et al. |
| 2005/0076536 A1 | 4/2005 | Hatfield et al. |
| 2005/0173117 A1 | 8/2005 | Roddy |
| 2005/0194141 A1 | 9/2005 | Sinclair et al. |
| 2006/0007922 A1 | 1/2006 | Boys |
| 2006/0047068 A1 | 3/2006 | Doane et al. |
| 2006/0048944 A1 | 3/2006 | van Batenburg et al. |
| 2006/0078682 A1 | 4/2006 | McDaniel et al. |
| 2006/0089266 A1 | 4/2006 | Dusterhoft et al. |
| 2006/0175059 A1 | 8/2006 | Sinclair et al. |
| 2006/0178271 A1 | 8/2006 | Lynch et al. |
| 2006/0211580 A1 | 9/2006 | Wang et al. |
| 2006/0240983 A1 | 10/2006 | Yamaguchi |
| 2006/0255490 A1 | 11/2006 | Gaytan |
| 2007/0036977 A1 | 2/2007 | Sinclair et al. |
| 2007/0051148 A1 | 3/2007 | Terenzio |
| 2007/0066754 A1 | 3/2007 | Loeker et al. |
| 2007/0074315 A1 | 3/2007 | Collin |
| 2007/0093387 A1 | 4/2007 | Sumi et al. |
| 2007/0114030 A1 | 5/2007 | Todd et al. |
| 2007/0114035 A1 | 5/2007 | Parris et al. |
| 2008/0045422 A1 | 2/2008 | Hanes et al. |
| 2008/0064614 A1 | 3/2008 | Ahrenst et al. |
| 2008/0066909 A1 | 3/2008 | Hutchins et al. |
| 2008/0108524 A1 | 5/2008 | Willberg et al. |
| 2008/0115692 A1 | 5/2008 | Welton et al. |
| 2008/0230223 A1 | 9/2008 | McCrary et al. |
| 2008/0234129 A1 | 9/2008 | Asrar et al. |
| 2008/0261834 A1 | 10/2008 | Simon |
| 2009/0065253 A1 | 3/2009 | Suarez-Rivera et al. |
| 2009/0123699 A1 | 5/2009 | Maniar et al. |
| 2009/0145025 A1 | 6/2009 | Thrash |
| 2009/0242833 A1 | 10/2009 | Chen et al. |
| 2009/0252789 A1* | 10/2009 | Trophardy ........... A61K 9/1652 424/463 |
| 2010/0071361 A1 | 3/2010 | Tandler et al. |
| 2010/0112200 A1 | 5/2010 | Barthel et al. |
| 2010/0189893 A1 | 7/2010 | Vitale et al. |
| 2010/0222242 A1 | 9/2010 | Huang et al. |
| 2010/0239642 A1 | 9/2010 | Campbell et al. |
| 2010/0248997 A1 | 9/2010 | Li et al. |
| 2010/0307749 A1 | 12/2010 | Nguyen et al. |
| 2010/0314114 A1 | 12/2010 | Moradi-Araghi et al. |
| 2011/0017677 A1 | 1/2011 | Evans |
| 2011/0079756 A1 | 4/2011 | Chun et al. |
| 2011/0098377 A1 | 4/2011 | Huang et al. |

(56) References Cited

U.S. PATENT DOCUMENTS

| | | | |
|---|---|---|---|
| 2011/0118155 A1 | 5/2011 | Pisklak et al. | |
| 2011/0120719 A1 | 5/2011 | Soane et al. | |
| 2011/0212834 A1 | 9/2011 | Andersch et al. | |
| 2011/0245113 A1 | 10/2011 | Phatak | |
| 2011/0245114 A1 | 10/2011 | Gupta et al. | |
| 2011/0265376 A1 | 11/2011 | Thrash et al. | |
| 2011/0289841 A1 | 12/2011 | Thrash | |
| 2012/0037364 A1 | 2/2012 | Guan et al. | |
| 2012/0080192 A1 | 4/2012 | Hendrickson et al. | |
| 2012/0190593 A1 | 7/2012 | Soane et al. | |
| 2012/0214714 A1 | 8/2012 | Whitwell et al. | |
| 2012/0225800 A1 | 9/2012 | Hendrickson | |
| 2012/0227967 A1 | 9/2012 | Shaikh et al. | |
| 2012/0305254 A1 | 12/2012 | Chen et al. | |
| 2013/0000900 A1 | 1/2013 | Kalgaonkar et al. | |
| 2013/0005569 A1 | 1/2013 | Hendrickson et al. | |
| 2013/0133251 A1 | 5/2013 | Thrash | |
| 2013/0161003 A1 | 6/2013 | Makarychev-Mikhailov et al. | |
| 2013/0233545 A1* | 9/2013 | Mahoney | C09K 8/80 166/280.2 |
| 2013/0274153 A1 | 10/2013 | Urbanek | |
| 2014/0000891 A1 | 1/2014 | Mahoney et al. | |
| 2014/0298722 A1 | 10/2014 | Thrash | |
| 2015/0068747 A1 | 3/2015 | Hwang et al. | |

FOREIGN PATENT DOCUMENTS

| | | | |
|---|---|---|---|
| WO | 8501736 A1 | 4/1986 | |
| WO | 1991013541 A1 | 9/1991 | |
| WO | 2005071412 A2 | 8/2005 | |
| WO | 2007086771 A1 | 8/2007 | |
| WO | 2009018327 A2 | 2/2009 | |
| WO | 2009078745 A1 | 6/2009 | |
| WO | 2009102565 A1 | 8/2009 | |
| WO | 2009123699 A2 | 9/2009 | |

OTHER PUBLICATIONS

Drill & Fill Manufacturing. DF24—Drill & Fill Aerator Head Specifications. http://www.drillandfillmfg.com/drill.html. Accessed May 27, 2008.

Drill & Fill Manufacturing. D60—Drill Aerator Head Specifications. http://www.drillandfillmfg.com/drill.html. Accessed May 27, 2008.

Drill & Fill Manufacturing. Drill & Fill Aerification. http://www.drillandfillmfg.com/options.html. Accessed May 27, 2008.

Hogentogler & Co , Inc. Sieves: ASTM E-11 I AASHTO T-27. M-92. http://www.hogentogler.com/sieves/200mm_metric_sieves.htm. Accessed Dec. 11, 2007.

Graden USA. Inc. CSI Contour Sand Injection Specifications. http://www.gradenusa.com/_Sand_Injection.php. Accessed May 27, 2008.

Silica Fume Association. "What is Silica Fume?" http://www.silicafume.org/general-silicafume.html. Accessed May 27, 2008.

AZ Materials. Silica-Fumed Silica (Silicon Dioxide). http://www.azom.com/details.asp?ArticleiD=1386. Accessed May 27, 2008.

DryJect: Soil Amendments. http://www.dryject.com/dryject/profile.cfm. Accessed May 27, 2008.

DryJect: How it Works. http://www.dryject.com/dryject/howitworks/index.cfm. Accessed May 27, 2008.

Barascav D, Halliburton, retrieved Aug. 19, 2014 from http://www.halliburton.com/public/bar/contents/Data_Sheets/web/Product_Data_Sheets/A_through_C/BARASCAV_D.PDF, dated May 19, 2010.

Non-Final Office Action dated Dec. 21, 2015 in U.S. Appl. No. 14/293,555, 11 pages.

Non-Final Office Action dated Jan. 7, 2016 in U.S. Appl. No. 14/594,396, 10 pages.

Final Office Action dated Apr. 20, 2016 in U.S. Appl. No. 14/293,555, 8 pages.

Non-Final Office Action dated Dec. 21, 2016 in U.S. Appl. No. 14/594,396, 10 pages.

Non-Final Office Action dated Feb. 16, 2017 in U.S. Appl. No. 14/171,920, 11 pages.

Emulsions, Dewatered Emulsions, Dispersons Catalog, SNF Floerger, Oct. 2014, Andrezieux, France, pp. 5-9, 28, and 29.

Final Office Action dated Dec. 5, 2016 in U.S. Appl. No. 14/293,555, 8 pages.

Non-Final Office Action dated Apr. 21, 2017 in U.S. Appl. No. 14/293,555, 11 pages.

Final Office Action dated May 4, 2017 in U.S. Appl. No. 15/014,623, 10 pages.

Non-Final Office Action dated May 10, 2017 in U.S. Appl. No. 15/136,352, 11 pages.

Final Office Action dated Jul. 12, 2017 in U.S. Appl. No. 14/594,396, 12 pages.

Bava, L. et al., "Controlling the Processing Behavior of Silica Agglomerates Using a Thermoresponsive Binder", 2005, 11 pages. Retrieved from: http://www.nt.ntnu.no./users/skoge/prost/proceedings/aiche-2005/non-topical/Non%20topical/papers/411d.pdf.

Pourjavadi, Ali et al., "Synthesis, characterization, and swelling behavior of alginate-g-poly(sodium acrylate)/kaolin superabsorbent hydrogel composites", Journal of Applied Polymer Science, Sep. 2007, 10 pages. Retrieved from: https://www.researchgate.net/publication/229732407.

Notice of Allowance dated Aug. 2, 2016 in U.S. Appl. No. 14/594,396, 7 pages.

Non-Final Office Action dated Sep. 6, 2016 in U.S. Appl. No. 15/014,623, 10 pages.

Non-Final Office Action dated Aug. 8, 2016 in U.S. Appl. No. 14/293,555, 8 pages.

Final Office Action dated Aug. 14, 2017 in U.S. Appl. No. 14/171,920, 12 pages.

Final Office Action dated Sep. 11, 2017 in U.S. Appl. No. 14/293,555, 11 pages.

Non-Final Office Action dated Sep. 28, 2017 in U.S. Appl. No. 15/014,623, 10 pages.

\* cited by examiner

HYDRAULIC FRACTURE COMPOSITION AND METHOD

RELATED APPLICATIONS

This application is a continuation in part of U.S. patent application Ser. No. 14/171,920, filed Feb. 4, 2014, which is a continuation of U.S. patent application Ser. No. 13/418,227, filed Mar. 12, 2012, now U.S. Pat. No. 9,057,014 issued Jun. 16, 2015; which is a continuation-in-part of U.S. patent application Ser. No. 13/299,288, filed Nov. 17, 2011, now U.S. Pat. No. 8,661,729 issued Mar. 4, 2014; which is a continuation-in-part of U.S. patent application Ser. No. 12/789,177, filed May 27, 2010, now U.S. Pat. No. 8,341,881 issued Jan. 1, 2013; which is a continuation of U.S. patent application Ser. No. 12/324,608, filed on Nov. 26, 2008 now U.S. Pat. No. 7,726,070, issued Jun. 1, 2010; which claims the benefit of U.S. Provisional Patent Application Ser. No. 61/012,912, filed Dec. 11, 2007; all of which are hereby incorporated by reference in their entirety.

BACKGROUND

1. The Field of the Invention

This invention relates to oil field and oil well development, and, more particularly, to novel systems and methods for fracturing and propping fissures in oil-bearing formations to increase productivity.

2. The Background Art

Oil well development has over one hundred years of extensive engineering and chemical improvements. Various methods for stimulating production of well bores associated with an oil reservoir have been developed. For example, United States Patent Application Publication US 2009/0065253 A1 by Suarez-Rivera et al. and entitled "Method and System for Increasing Production of a Reservoir" is incorporated herein by reference in its entirety and provides a description of fracturing technology in order to increase permeability of reservoirs. Moreover, various techniques exist to further improve the fracture channels, such as by acid etching as described in U.S. Pat. No. 3,943,060, issued Mar. 9, 1976 to Martin et al., which is likewise incorporated herein by reference in its entirety.

In general, different types of processes require various treatments. In general, well production can be improved by fracturing formations. Fracturing is typically done by pumping a formation full of a fluid, containing a large fraction of water, and pressurizing that fluid in order to apply large surface forces to parts of the formation. These large surface forces cause stresses, and by virtue of the massive areas involved, can produce extremely high forces and stresses in the rock formations. Accordingly, the rock formations tend to shatter, increasing porosity an providing space for the production oil to pass through the formation toward the bore hole for extraction. However, as the foregoing references describe, the chemistry is not simple, the energy and time required for incorporation of various materials into mixtures is time, money, energy, and other resource intensive.

It would be an advance in the art if such properties as viscosity, absorption, mixing, propping, and so forth could be improved by an improved composition and method for introduction.

BRIEF SUMMARY OF THE INVENTION

In view of the foregoing, in accordance with the invention as embodied and broadly described herein, a method, apparatus, and composition are disclosed in certain embodiments in accordance with the present invention, as including a substrate that may be formed of sand, rock product, ceramic sand, gravel, or other hard and structurally strong materials, provided with a binder to temporarily or permanently secure a hydrating polymer in proximity to the substrated. When used herein any reference to sand or proppant refers to any or all of these used in accordance with the invention. In certain embodiments of a method in accordance with the invention, a composition as described may be mixed directly into drilling fluids, such as a fracturing fluid made up of water and other additives.

By virtue of the increased surface area and weight provided to the polymeric powders affixed to the substrate, the surface area, and consequently the frictional drag, is greatly increased, sweeping the material of the invention into a flow of fluid. This greatly decreases the time required to absorb polymers into the fluid.

In fact, rather than having to wait to have the polymers thoroughly mixed, or absorb a full capacity of water, and thereby flow properly with the drilling fluid or fracturing fluid, a composition in accordance with the invention will sweep along with the fluid immediately, with the weight of the substrate submerging the polymer. Meanwhile, the cross sectional area presented results in hydrodynamic drag sweeps the composition along with the flow.

Meanwhile, over time, the polymeric powder adhered to the substrate will absorb water, without the necessity for the time, energy, temperature, mixing, and so forth that might otherwise be required by surface mixing. Thus, the composition in accordance with the invention is immediately transportable and flows, relying on the drilling or fracturing fluid as its carrier.

Moreover, as the polymer tends to pick up more water, the density of the granule of substrate and polymer powder becomes closer to the density of water. Accordingly, the size increase and the density change tend to drive the particles of the composition even more homogeneously with the flowing fluid. Thus, the sand does not settle out in various eddies, obstructions, and other locations of low velocity. Rather, the sand continues to be carried with the fluid, providing a double benefit. That is, the sand weight and area helps to initially mix and drive the particles (granules) with the fluid. Thereafter, the hydration of the polymer tends to increase the surface area and reduce the density of the granule or particle, tending to make the particles flow even better and more homogeneously with the surrounding fluid.

Ultimately, as the particles (granules) of the composition flow into fracture locations, they provide very small proppants as the substrate, such as sand, becomes trapped and lodged at various choke points. Nevertheless, because of the small size, the sand or other substrate acting as a proppant, simply needs to provide an offset, keeping fractured surfaces from collapsing back against one another. By providing the small, strong points of separation, the substrate provides a well distributed proppant, carried to maximum extent that the fluids will travel, and deposited in various traps, choke points, and the like.

The net saving in time, money, energy for heating and pumping, and the like is significant. Meanwhile, various technologies for reducing friction in the flow of fluid pumped into bore holes and other formation spaces is described in several patents, including U.S. Pat. No. 3,868,328, issued Feb. 25, 1975 to Boothe et al. and directed to friction reducing compounds, as well as U.S. Pat. No. 3,768,565, issued Oct. 30, 1973 to Persinski et al. and directed to friction reducing, U.S. Patent Application Publication US 2001/0245114 A1 by Gupta et al. directed to well servicing fluid, and U.S. Patent Application Publication US 2008/0064614 A1 by Ahrenst et al. and directed to friction reduction fluids, all described various techniques, materials, methods, and apparatus for developing, implementing, and benefitting from various well fluids. All the foregoing patent application publications and patents are hereby incorporated by reference.

Similarly, the development of various chemicals has been ubiquitous in oil field development. For example, U.S. Pat. No. 3,442,803, issued May 6, 1969 to Hoover et al. is directed to thickened friction reducers, discusses various chemical compositions, and is also incorporated herein by reference in its entirety.

In one embodiment of an apparatus, composition and method in accordance with the invention, a method may be used for formation fracturing. The formation may be in rock and within or near an oil reservoir underground. One may select an oil field region having a formation to be fractured. Fracturing may be sought to increase production. By providing a bore into the formation and a pump, a carrier material, typically comprising a liquid, and sometimes other materials dissolved or carried therein may be pumped into the formation through the bore.

The carrier as a liquid, or slurry comprising a liquid, or otherwise containing a liquid may be driven by the pump to be pressurized into the formation. However, the carrier may be provided an additive formed as granules. Each granule may include a substrate, such as a grain of sand, ceramic sand, crushed rock, other rock products, or the like having bonded thereto many particles (e.g. powder) formed from a polymer.

The polymer may be selected to have various properties, including lubricity, water absorption, water solubility, or the like. This hydrophilic polymer may be bonded permanently, temporarily, or the like to secure to the substrate. Various binders may be used alone or in combination. These may range from a solvent (e.g., organic or water) simply softening the polymer itself to bond it, to glues, sugars, molasses, and various other saccharides, as well as other products, including starches, other polymers, and so forth.

Thus, with some bonds, the polymer powder may be less permanent or attached to have a bond that is less robust. Over time, the polymer powder so attached may wear off, pull away, or otherwise remove from the substrate into the carrier fluid, and may even act as a viscous agent, lubricant, or the like in the carrier.

The method may include introducing the additive directly into the carrier. The more dense substrate will immediately submerge the granules in the carrier at ambient conditions. Thus heating, extensive mixing, waiting, and the like may be dispensed with, as the granules typically will not float or resist mixing once initial surface tension is broken.

Pumping the carrier toward the formation is possible immediately. The carrier fluid carries the granules by the liquid dragging against the substrate (with the particles of polymer attached. The substrate's cross sectional area engages immediately the surrounding liquid, dragging it into the carrier to flow substantially immediately therewith.

Meanwhile, weighting, by the substrate of the polymer, permits the granules to flow into and with the carrier independently from absorption of any of the liquid into the polymer. Nevertheless, over time, absorbing by the polymer a portion of the liquid results in the polymer expanding and providing by the polymer, lubricity to the carrier with respect to the formation;

Creating fractures may be accomplished by pressurizing the carrier in the formation. This creates fissures or fractures. Thus, flowing of the carrier and particles throughout the fractures or fissures in the formation results in lodging, by the particles, within those fractures or fissures. Unable to re-align, adjacent surfaces of rock, now fracture cannot close back together due to propping open the fractures by the substrate granules lodging in the fractures.

The substrate is best if selected from an inorganic material, such as sand, ceramic sand, or other hard, strong, rock product. The polymer may be selected from natural or synthetically formulated polymers. For example polymers of at acrylic acid, acrylate, and various amides are available. Polyacrylamide has been demonstrated suitable for all properties discussed above.

In fracturing a rock formation, the method may include providing an additive comprising a substrate formed as granules, each having an exterior surface, particles formed of a hydrophilic material, the particles being comminuted to a size smaller than the size of the granules and having first and second sides comprising surfaces. The granules may each be coated with the particles, the particles being dry and bonded to the exterior surface by any suitable binder, including the polymer softened with a solvent. The particles are each secured by the first side to the granules, the second side extending radially outward therefrom.

Upon identifying a reservoir, typically far underground from thousands of feet to miles, perhaps, and extending in a formation of rock, one needs to provide a bore into the formation. Providing a carrier, comprising a liquid, and possibly other materials known in the art, is for the purpose of fracturing the formation. Introducing the additive directly into the liquid at ambient conditions is possible, because the substrate weighs the granules down, and there is no need for long mixing, heating or the like as in addition of polymers directly to the carrier.

Thus, pumping may continue or begin immediately to move the carrier and additive down the bore and toward the formation. This results in exposing the second sides of the polymer powder particles directly to the liquid during transit of the carrier and additive toward and into the formation. The polymer particles thus begin absorbing, a portion of the liquid, typically principally water. Swelling of the polymer increases the size, effective diameter, and cross-sectional area, thus increasing the fluid drag on the granules.

Fracturing, typically by hydraulic pressure in the carrier creates fissures in the formation by fracturing the rock pieces in bending, or by layer separation, with tensile stresses breaking the rock. The resulting fissures allow carrying, by the carrier, of the granules into the fissures. However, fissures vary in size and path, resulting in lodging of granules, within the fissures. The granules do not settle out from the carrier, and thus may travel far into the formation and every fissure. However, each time a grain or granule is lodged like a chock stone, it obstructs the ability of the adjacent rock surfaces to close back with one another.

Thus, rather than the proppant (substrate) settling out ineffectually, failing to prop open the fissures, the granules are swept forcefully with the flow of the carrier wherever the carrier can flow, until lodged. Meanwhile, the lubricity of the polymer aids the granules, and thus the substrate from being slowed, trapped, or settled out by the slow flowing boundary layer at the solid wall bounding the flow.

In summary, weighting, by the substrate, sinks the polymer into the carrier readily and independently from absorption of the liquid into the polymer. Mixing, dissolving, and so forth are unnecessary, as the substrate drags the polymer into the carrier, and the carrier drags the granule along with it in its flow path. Lubrication is provided by the polymer between the substrate of each granule and adjacent solid walls of the bore, passages previously existing in the formation, and the fissures formed by fracturing. Any separating, by some of the powdered polymer particles from the substrate, still reduces friction drag on passage of the carrier and particles within the formation.

A composition for fracturing and propping a formation of rock may include a fluid operating as a carrier to be pumped into a rock formation, a substrate comprising granules of an inorganic material, each granule having an outer surface and a size characterized by a maximum dimension thereacross, and all the granules together having an average maximum dimension corresponding thereto. A polymer comprising a hydrophilic material selected to absorb water in an amount greater than the weight thereof may be bound to the substrate. The polymer is comminuted to particles, each particle having a size characterized by a maximum dimension thereacross.

All the polymer particles may be characterized by an average maximum dimension, and an effective (e.g. hydraulic diameter). The average maximum dimension of the particles is best if smaller, preferably much smaller, than the average maximum dimension of the granules.

The particles of the polymer, bound to the substrate, will travel with it in the fluid. Particles of the polymer are thus further directly exposed to water in the fluid during travel with the fluid. The granules, flowing in the fluid, are carried by the hydrodynamic drag of the fluid against the cross-sectional area of the granules coated with the particles of the polymer. The polymer, selected to expand by absorbing water directly from the fluid, increases the area and drag, assisting distribution in the formation by the carrier fluid. The polymer meanwhile operates as a lubricant lubricating the motion of the substrate against the formation during flow of the granules against solid surfaces in the formation, bore, and fracture fissures.

The inorganic material, such as sand, ceramic sand, or the like is typically sized to lodge in fissures formed in the formation and has mechanical properties rendering it a proppant capable of holding open fissures formed in the formation.

In one embodiment, a method for making self-suspending proppant particles is provided. The method includes mixing a volume of substrate particles with a liquid binder so that at least a portion of the volume of substrate particles are at least partly covered with the liquid binder on an outer surface, thereby forming binder-coated substrate particles. The method also includes using a water-in-oil emulsion to apply a first water-absorbing polymer to at least a portion of the binder-coated substrate particles so that the at least a portion of the binder-coated substrate particles are at least partly coated with the first water-absorbing polymer, thereby forming intermediate polymer-coated substrate particles. The method further includes coating at least a portion of the intermediate polymer-coated substrate particles with a second water-absorbing polymer to thereby form polymer coated substrate particles; and drying the polymer coated substrate particles to remove at least a portion of the water-in-oil emulsion to thereby form self-suspending proppant particles. Each of the self-suspending proppant particles are at least partly coated with the second water-absorbing polymer.

In another embodiment, a method for making self-suspending proppant particles is provided. The method includes adding a volume of substrate particles to a mixing vessel, the substrate particles including sand particles. The method also includes applying a first water-absorbing polymer suspended in a liquid to at least a portion of the substrate particles in the mixing vessel, so that the at least a portion of the substrate particles are at least partly coated with the first water-absorbing polymer, thereby forming intermediate polymer-coated substrate particles. The first water-absorbing polymer includes an anionic polyacrylamide. The method further includes coating at least a portion of the intermediate polymer-coated substrate particles with a second water-absorbing polymer in powdered form to thereby form polymer-coated substrate particles; and drying at least a portion of the polymer coated substrate particles to remove at least a portion of the liquid thereby forming self-suspending proppant particles.

In yet another embodiment, self-suspending proppant particles are provided. The self-suspending proppant particles including substrate particles, the substrate particles including sand. The self-suspending proppant particles further including an outer polymeric coating positioned on an outer surface of each of the substrate particles, the outer polymeric coating including at least one water-absorbing polymer in powdered form, where at least a portion of the outer polymeric coating is applied to each of the substrate particles using a water-in-oil emulsion.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
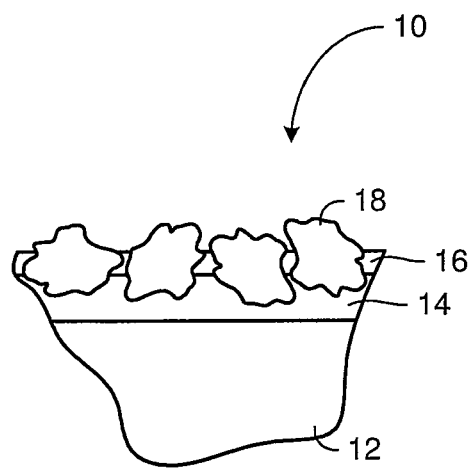
FIG. 1 is a schematic cross-sectional view of a material including a substrate provided with a binder securing a hydrating polymer thereto in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a material 10 in accordance with the invention may include a substrate 12 formed of a suitable material for placement in the vicinity of a fracture region. For example, a substrate may be a particle of sand, ceramic sand, volcanic grit, or other hard material. In some embodiments, a substrate may be formed of organic or inorganic material. Nevertheless, it has been found effective to use sand as a substrate 12 inasmuch as it is submersible in water and will not float as many organic materials will when dry Likewise, the sand as substrate 12 is comminuted to such a small size that interstices between individual grains of the sand substrate 12 provide ample space and minimum distance for water to surround each of the substrate 12 particles.

In the illustrated embodiment, a binder 14 may be distributed as a comparatively thin layer on the surface of the substrate 12. Typical materials for binders may include both temporary and permanent binders 14. Permanent binders include many polymers, natural and synthetic. Temporary binders may be sugar-based or other water soluble materials. For example, corn syrup, molasses, and the like may form temporary binders. In the presence of water, such material may ultimately dissolve. Nevertheless, so long as the substrate 12 is not turned, mixed, or otherwise disturbed significantly, any other materials supported by the binder 14 would not be expected to dislocate.

Otherwise, certain naturally or synthetically occurring polymers may also be used as a binder 14. Lignicite may be used as a binder 14. Lignicite is a byproduct of wood, and provides material having good adhesive properties, and substantial permanence as a binder 14 on a substrate 12. Any suitable insoluble polymer may be used for more permanent binding.

Other polymers may be used to form a binder 14. For example, various materials used as glues, including mucilage, gelatin, other water soluble polymers including, for example, Elmer's™ glue, and the like may also operate as binders 14 to bind materials to a substrate 12.

In certain embodiments, the substrate 12 may be used in oil fields as a substrate 12 for polymer additives to fracture fluids. In other situations, the substrate 12 may be implemented as a proppant.

Pigment 16 may be implemented in any of several manners. For example, the substrate 12 may have pigment 16 applied prior to the application of the binder 14. In alternative embodiments, the pigment 16 may actually be included in the binder 14, which becomes a pigmented coating on the substrate 12. In yet other embodiments, the pigments 16 may be added to a hydration particle 18 either as a pigment 16 mixed therein, or as a pigment 16 applied as a coating thereto. Thus the location of the pigment 16 in the Figures is schematic and may take alternative location or application method.

Particles 18 of a hydrophilic polymer material may be bonded to the substrate 12 by the binder 14. Particles may be sized to substantially coat or periodically coat the substrate 12.

In certain embodiments, the hydrophilic material 18 may be a powdered polymeric material 18 such as polyacrylamide or any of the materials in the patent documents incorporated by reference. In other embodiments, the particles 18 may actually be organic material having capillary action to readily absorb and hold water. In one presently contemplated embodiment of an apparatus in accordance with the invention, the particles 18 may be powdered polymeric material in a dehydrated state, and having a capacity to absorb water, typically many times the weight (e.g., five to forty times) of a particular particle 18.

The substrate 12, in certain embodiments, may be some form of sand or grannular material. The sand will typically be cleaned and washed to remove dust and organic material that may inhibit the binder 14 from being effective Likewise, the substrate 12 may be sized of any suitable size. For example, sand particles may range from much less than a millimeter in effective diameter or distance thereacross to approximately two millimeters across. Very coarse sands or ceramic sands may have even larger effective diameters. Hydraulic diameter is effective diameter (four times the area divided by the wetted perimeter). However, in one presently contemplated embodiment, washed and dried sand such as is used in construction, such as in concrete, has been found to be suitable. Fine sands such as masonry sands tend to be smaller, and also can function suitably in accordance with the invention.

Accordingly, the distance across each powder particle 18 may be selected to provide an effective coating of powdered particles 18 on the substrate 12. In one presently contemplated embodiment, the effective diameter of the particles 18 may be from about a 30 mesh size to about a 100 mesh size. For example, a sieve system for classifying particles has various mesh sizes. A size of about 30 mesh, able to pass through a 30 mesh sieve, (i.e., about 0.6 mm) has been found suitable Likewise, powdering the particles 18 to a size sufficiently small to pass through a 100 mesh (i.e., about 0.015 mm) sieve is also satisfactory. A mesh size of from about 50 mesh to about 75 mesh is an appropriate material to obtain excellent adhesion of particles 18 in the binder 14, with a suitable size of the particles 18 to absorb significant liquid at the surface of the substrate 12.

As a practical matter, about half the volume of a container containing a substrate 12 as particulate matter will be space, interstices between the granules of the substrate 12. One advantage of using materials such as sand as the substrate 12 is that a coating of the particles 18 may provide a substantial volume of water once the particles 18 are fully saturated. By contrast, where the size of the particles 18 is too many orders of magnitude smaller than the effective diameter or size of the substrate particles 12, less of the space between the substrate particles 12 is effectively used for storing water. Thus, sand as a substrate 12 coated by particles 18 of a hydrophilic material such as a polymer will provide substantial space between the substrate particles 12 to hold water-laden particles 18.

The diameter of the particles 18, or the effective diameter thereof, is typically within about an order of magnitude (e.g., 10.times.) smaller than the effective diameter of the particles of the substrate 12. This order of magnitude may be changed. For example, the order of magnitude difference less than about 1 order of magnitude (i.e., 10.times.) may still be effective. Similarly, an order of magnitude difference of 2 (i.e., 100.times.) may also function.

However, with particles 18 too much smaller than an order of magnitude smaller than the effective diameter of the substrate 12, the interstitial space may not be as effectively used Likewise, with an effective diameter of particles 18 near or larger than about 1 order of magnitude smaller than the size of the particles of the substrate 12, binding may be less effective and the particles 18 may interfere more with the substrate itself as well as the flow of water through the interstitial spaces needed in order to properly hydrate a material 10.

Figure 2:
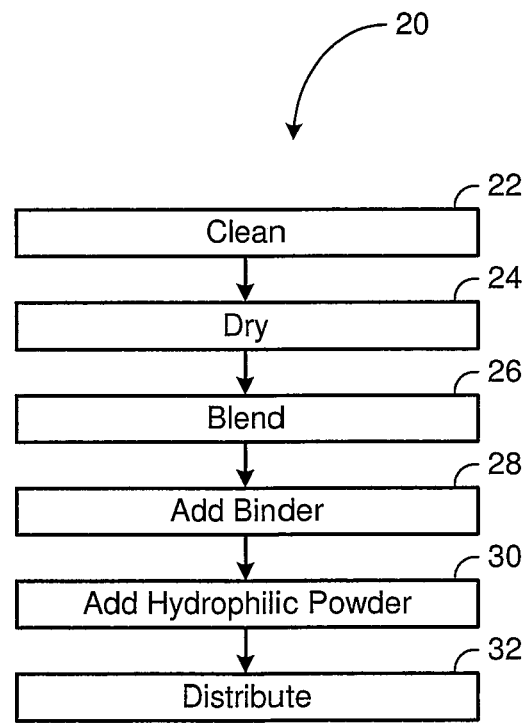
FIG. 2 is a schematic block diagram of one embodiment of a process for formulating and producing fluid additive particles in accordance with the invention.

Referring to FIG. 2, an embodiment of a process for formulating the material 10 may involve cleaning 22 the material of the substrate 12. Likewise, the material of the substrate 12 may be dried 24 to make it more effective in receiving a binder 14. The material of the substrate 12 may then be blended 26.

One embodiment, a ribbon blender provides an effective mechanism to perform continuous blending as the binder 14 is added 28. Other types of mixers, such as rotary mixers, and the like may be used. However, a ribbon blender provides a blending 26 that is effective to distribute binder 14 as it is added 28.

For example, if an individual particle of the substrate 12 receives too much binder 14, and thus begins to agglomerate with other particles of the substrate 12, a ribbon binder will tend to separate the particles as a natural consequences of its shearing and drawing action during blending 26.

As the binder 14 is added 28 to the mixture being blended 26, the individual particles of the substrate 12 will be substantially evenly coated. At this stage, the binder 14 may also be heated in order to reduce its viscosity and improve blending. Likewise, the material of the substrate 12 or the environment of the blending 26 may be heated in order to improve the evenness of the distribution of the binder 14 on the surfaces of the substrate 12 materials or particles 12.

Blending 26 of the binder 14 into the material of the substrate 12 is complete when coating is substantially even, and the texture of the material 10 has an ability to clump, yet is easily crumbled and broken into individual particles. At that point, addition 30 of the hydrophilic particles 18 may be accomplished.

For example, adding 30 the particles 18 as a powder into the blending 26 is a naturally stable process. Typically the particles 18 attach to the binder 14 of the substrate 12 particles, thus removing from activity that location. Accordingly, other particles 18 rather than agglomerating with their own type of material will continue to tumble in the blending 26 until exposed to a suitable location of binder 14 of the substrate 12. Thus, the adding 30 of the particles 18 or powder 18 of hydrophilic material will tend to be a naturally stable process providing a substantially even coating on all the particles of the substrate 12.

Just as marshmallows are dusted with corn starch, rendering them no longer tacky with respect to one another, the material 10 formulated by the process 20 are dusted with particles 18 and will pour freely. Accordingly, distribution 32 may be conducted in a variety of ways and may include one or several processes. For example, distribution may include marketing distribution from packaging after completion of blending 26, shipping to distributers and retailers, and purchase and application by users.

An important part of distribution 32 is the deployment of the material 10. In one embodiment of an apparatus and method in accordance with the invention, the material 10 may be poured, as if it were simply sand 12 or other substrate 12 alone. Since the powder 18 or particles 18 have substantially occupied the binder 14, the material 10 will not bind to itself, but will readily pour as the initial substrate material 12 will.

The material 10 may typically include from about 1 percent to about 20 percent of a hydrophilic material 18 or particles 18. The particles 18 may be formed of a naturally occurring material, such as a cellulose, gelatin, organic material, or the like.

In one embodiment, a synthetic gel, such as polyacrylamide may be used for the particles 18, in a ratio of from about 1 to about 20 percent particles 18 compared to the weight of the substrate 12. In experiments, a range of from about 5 to about 10 percent has been found to be the most effective for the amount particles 18.

Sizes of particles 18 may range from about 20 mesh to smaller than 100 mesh. Particles 18 of from about 50 to about 75 mesh have been found most effective.

The binder 14 may typically be in the range of from about in ¼ percent to about 3 percent of the weight of the substrate 12. A range of from about ¾ percent to about 1½ percent has been found to work best. That is, with a binder such as lignicite, ¼ of 1 percent has been found not to provide as reliable binding of particles 18 to the substrate 12. Meanwhile, a ratio of higher than about 3 percent by weight of binder 14 to the amount of a substrate 12, such as sand, when using lignicite as the binder 14, tends to provide too much agglomeration. The pouring ability of the material 10 is inhibited as well as the blending 26, due to agglomeration. Other binders also operate, including several smaller molecules that are water soluble. For example, glues, gelatins, sugars, molasses, and the like may be used as a binder 14. Insoluble binders are also useful and more permanent.

One substantial advantage for the material 10 in accordance with the present invention is that the material remains flowable as a sand-like material 10 into the fluids to be used in oil field fracturing. Thus, handling and application is simple, and the ability of granular material 10 to flow under and around small interstices of fractures provides for a very effective application.

Figure 3:
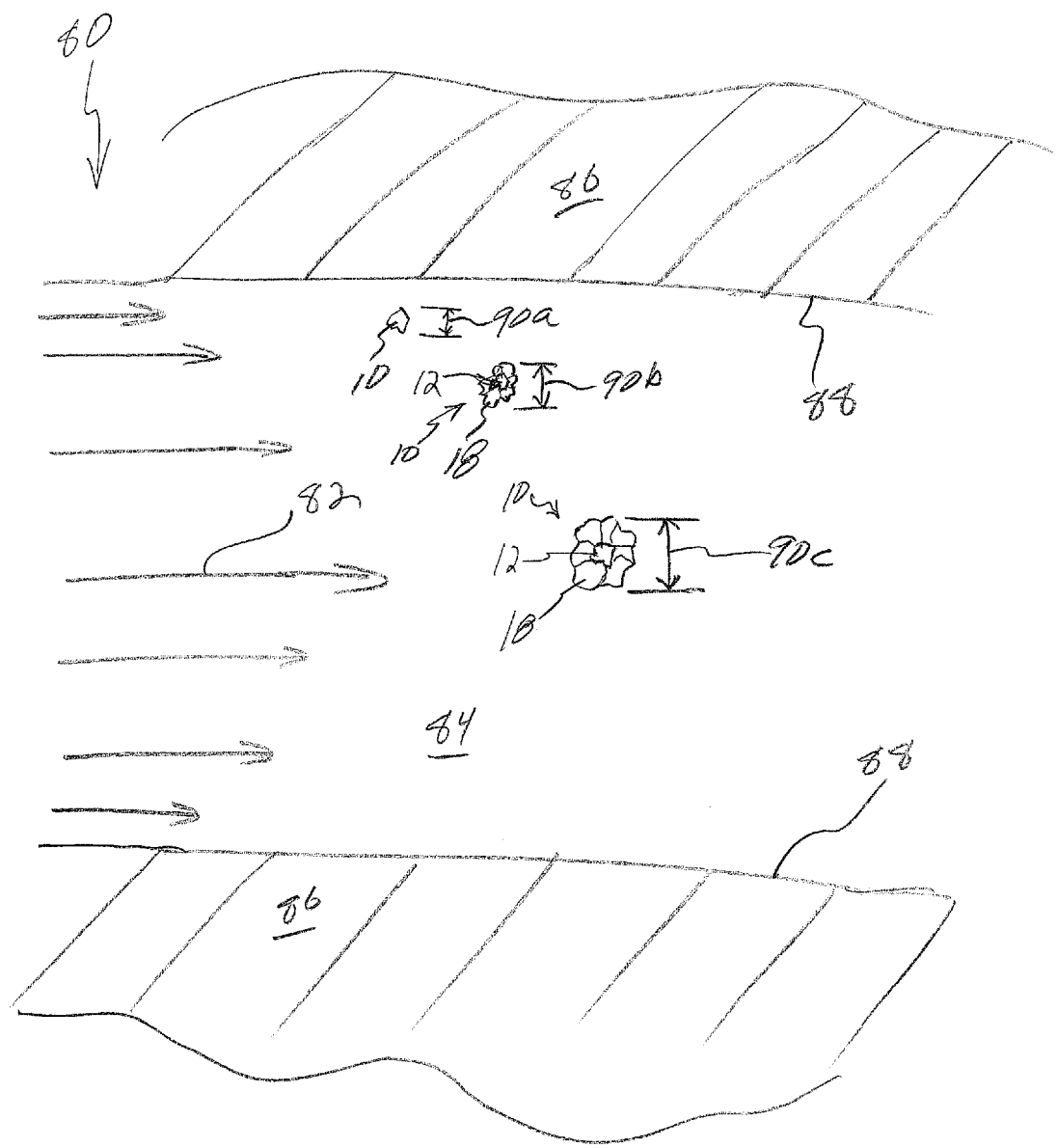
FIG. 3 is a schematic diagram of the fluid-particle interaction in an apparatus, composition, and method in accordance with the invention.

Referring to FIG. 3, a formation 80 such as a reservoir area of an oil may increase large and small flows 82 in passages 84 formed in the rock 86 of the formation 80. Typically, the flow 82 represented by arrows 82 indicating the development of flow at a faster speed in center of a passage 84, and the lower velocity near the wall 88 of the passage 84, illustrates the flow 82 of fluid in the passage 84.

In the illustrated embodiment, the granules 10 or large composite particles 10 or the materials 10 formed as a granulated material 10, having the substrate 12 in the center column with the polymer 18 adhered by a binder 12 on the outside thereof. This material 10 may be added to a flow 82 being pumped into a formation 80. Initially, a particle 10 will have an effective diameter 90a. In this condition, the particle 10 of material 10 is largely dependant on the density of the substrate 12, which constitutes the majority of its volume. Eventually, over time, with exposure to the liquid 82 or flow 82 and the water of that flow 82, the polymer 18 will absorb water, increasing in its effective diameter 90b. Ultimately, the polymer 18 or the polymer powder 18 will eventually become fully hydrated, increasing many times its size, and beginning to dominate the effective diameter 90c or hydraulic diameter 90c of the particle 10.

Initially, the diameter 90a reflects the comparatively smaller size and larger density of the particle 10 dominated by the weigh of the substrate 12, such as sand, ceramic sand, or some other hard and strong material. Ultimately, the diameter 90a or effective diameter 90a is sufficient to provide fluid drag according to fluid dynamic equations, drawing the particle 10 into the flow 82.

Meanwhile, the increase in diameter 90b and the ultimate effective diameter 90c result in reduction of the density of the particle 10 as the polymer 18 absorbs more water, bringing the net density of the particle 10 closer to the density of water. Accordingly, the particles 10 flow with the water exactly in sync, so to speak, rather than settling out as a bare substrate 12 would do.

For example, in areas where eddies in the flow occur, such as corners, crevices, walls, and the like, heavy materials having higher density, such as sand and the like, normally will tend to drift out of the flow, toward a wall 88, and ultimately will settle out. Instead, by virtue of the large "sail" presented by the larger diameter 90c of a fully hydrated polymer 18, each particle 10 stays with the flow 82 in passage 84, providing much more effective transport.

Figure 4:
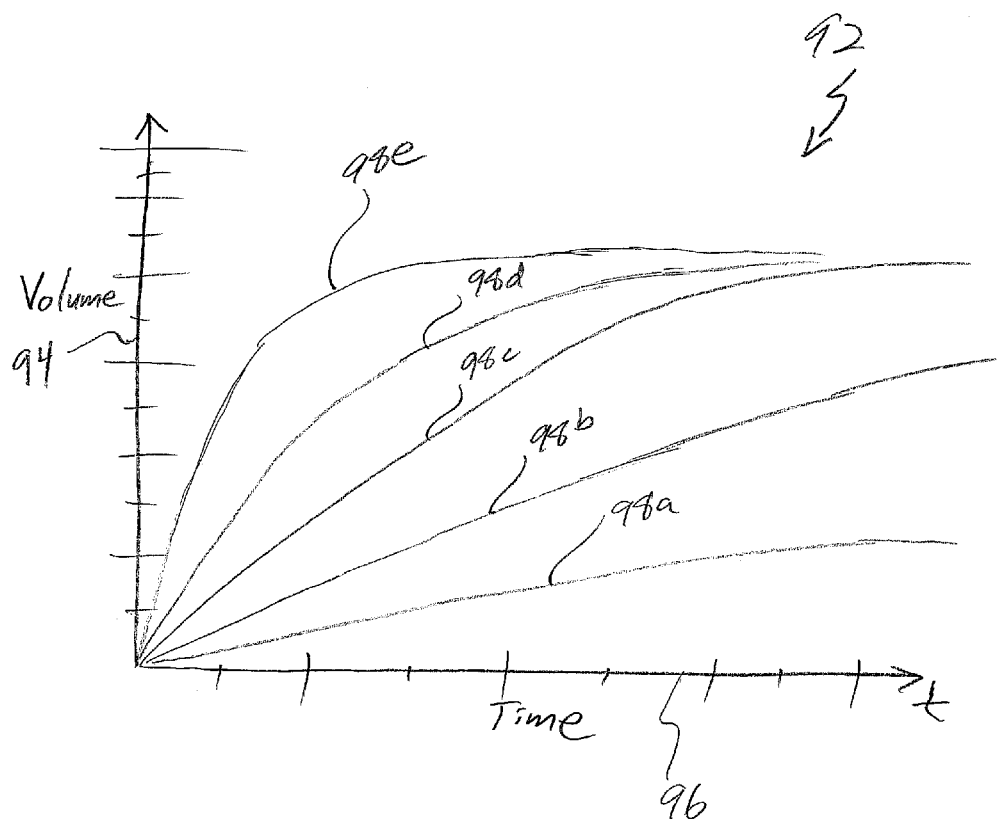
FIG. 4 is a chart illustrating qualitatively the relationship between volumetric increase over time at various temperatures, illustrating the improved activation with minimum mixing and temperature increase of particles in accordance with the invention.

Referring to FIG. 4, a chart 92 illustrates a volume axis 94 representing the volume of a particle 10 or material 10 in accordance with the invention. The volume axis 90 is displayed orthogonally with respect to a time axis 96, representing the passage of time of the particle 10 submerged in a carrier 82 or flow 82 of fluid 82. Typically, at different temperatures, illustrated by curves 98a-98e, with the temperature associated with curve 98a being the coldest and the temperature associated with the curve 98e being the hottest, one can visualize how heat added to a fluid flow 82 tends to increase the chemical activity and thus the rate of absorption of water into a polymer 18.

In an apparatus and method in accordance with the invention, the particles 10 may be added directly to a flow 82, without waiting for any significant time to absorb water into the polymer 18. Instead, the normal flow 82 will draw the particles 10 along in a passage 84 while exposing each individual particle 10 to surrounding fluid 82, thus promoting maximum rates of exposure and increased rates of absorption. Accordingly, the volume 94 increases, representing an increase in the absorption of water into the polymer 18.

In an apparatus and method in accordance with the invention, the curve 98a is suitable because the entire travel within the well bore, and within the formation 80 by the fluid 82 bearing the particles 10 is permissible and available as absorption time. By contrast, prior art systems rely on the increased temperature of curve 98e in order to provide the time, temperature, and mixing to work polymers into a flow 82 or liquid carrier 82.

Figure 5:
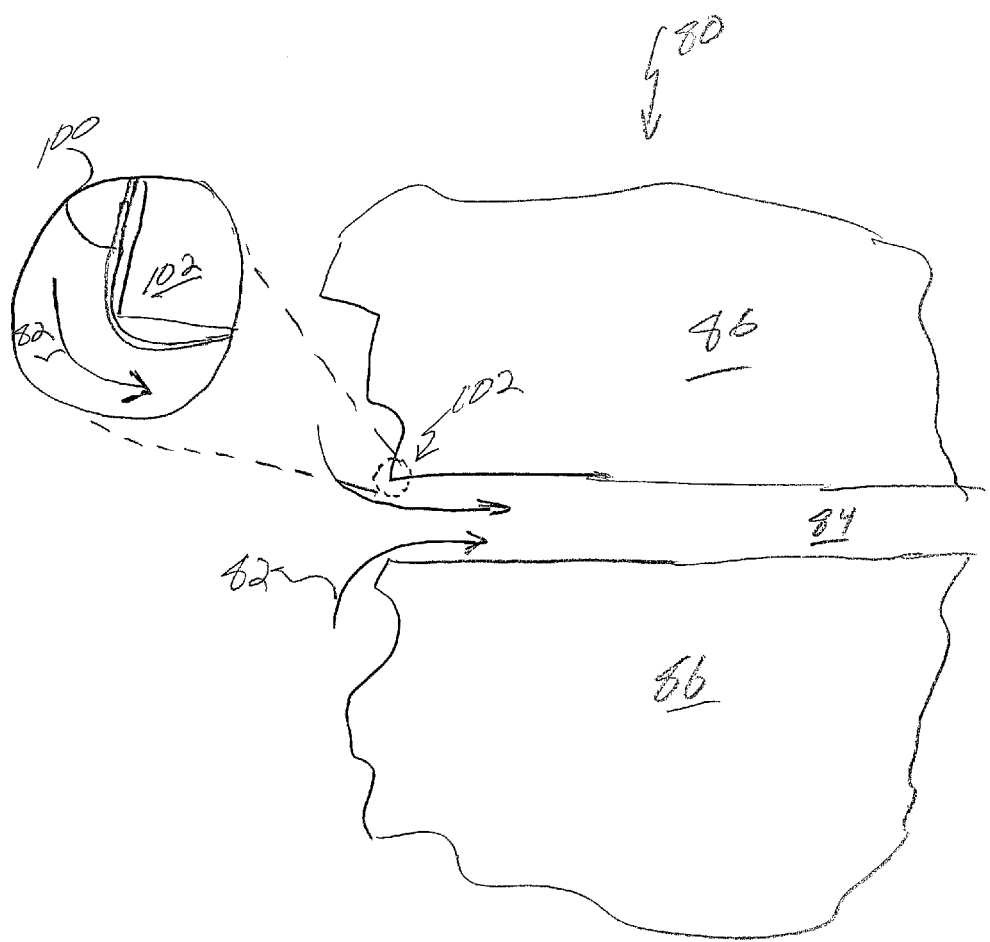
FIG. 5 is a schematic diagram illustrating one embodiment of friction reducing by polymers used in compositions in accordance with the invention.

Referring to FIG. 5, in one embodiment of an apparatus, composition, and method in accordance with the invention, some of the polymer 18 may eventually be scraped, sheared, or otherwise removed from the particles 10. If bonded only by itself with a water solvent, such a separation may be easier than if bonded by a more durable polymer. Such a release may even be engineered, timed, controlled by a solvent, or the like.

Thus, a certain amount of the polymer 18 may be released from the granule 10 into the carrier fluid 82 to flow with the fluid 82 and operate as a general friction reducer or provide its other inherent properties to the carrier fluid 82. By an engineered process of bonding and un-bonding, the polymer powder may be less permanent or attached to have a bond that is less robust. Over time, the polymer powder so attached may release, tear, wear off, pull away, or otherwise remove from the substrate into the carrier fluid to act as a viscosity agent, surfactant, lubricant, or the like in the carrier, according to its known properties available for modifying the carrier 82.

For example, a polymer 100 or polymer chain 100 may be captured on a corner 102 defining a passage 84 into which a flow 82 will proceed. Accordingly, the corner 102 renders less of an orifice on the passage 84 against entry of the flow 82 by virtue of the friction reduction of the polymer 100 in the fluid, deposited temporarily or permanently about a corner 102. Thus, other particles 10 passing the corner 100 may shear off a portion of the polymer 18 carried thereby or may rely on the presence of the polymer 18 as a direct friction reducing agent on the particle 10 (granule) itself, permitting the particles 10 to pass more easily with the flow 82 into the passage 84.

Figure 6:
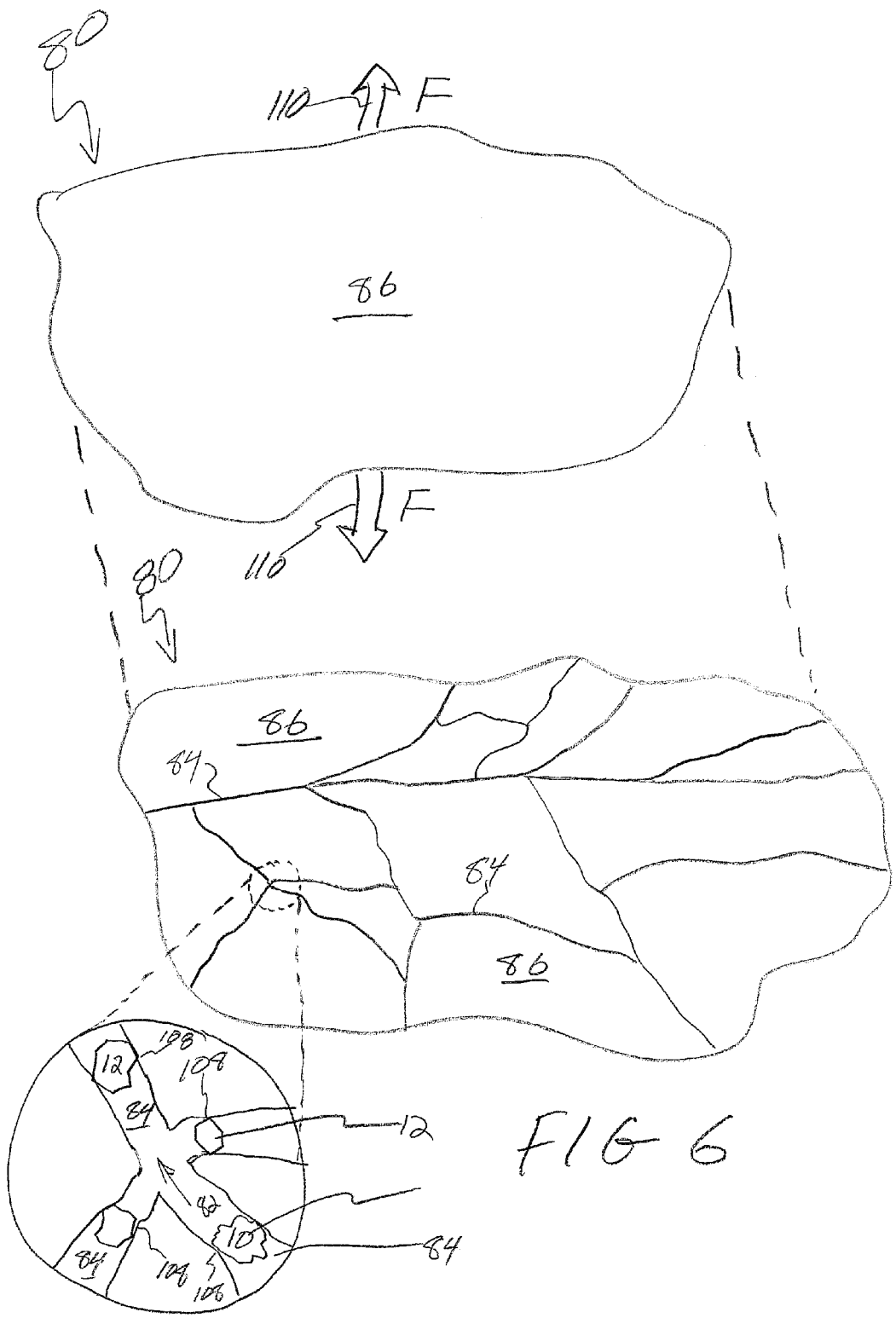
FIG. 6 is a schematic diagram of the fracturing and proppant action of particles in accordance with a method and composition according to the invention.

Referring to FIG. 6, the fracture process is described in various literature, including U.S. Patent Application publication US 2009/0065253 by Suarez-Rivera et al. incorporated herein by reference. In a fracturing process, the pressure applied to a formation 80 tends to force apart large expanses of rock. As a result of that expansion of passages 84 in a rock formation 80, the rock is stressed. Pressure pumped into the fluid 82 flowing in the passages 84 within the formation 80 results in bending stresses, tensile stresses, and so forth in the formation 80.

In FIG. 6, the forces 110 illustrated the effect of a large pressure applied over a large area. Since pressure multiplied by area equals force, applying an elevated hydraulic pressure to a large surface of a rock 86 or rock segment 86 within a formation 80 results in tensile forces. Compressive forces will not tend to break rock. However, a tensile force, which may be induced by bending, expansion, or the like, results in fracture of the rock. The fracture of the rock 86 thus results in condition shown in the lower view, in which the passages 84 are mere fissures within the rock 86.

The inset of FIG. 6 magnifies the fissures 84 or passages 84 formed in the rock 86 and immediately entered by the working fluid 82 being used for the fracture. Having the particles 10 formed around substrates 12, the fluid 82 extends into each of the fissures formed. Fissures 84 are simply passages 84. Some may be large, others small. Proppants 10 trapped in a small location may still maintain opened in another opening much larger elsewhere on the rock 86. They may also collect and fill larger spaces, eliminating the ability for rocks 86 to return to former positions.

After fracturing rock 86 to form all of the fissures 84, the fluid 82 will pass through the fissures, carrying particles 10, which eventually collect in cavities or reach choke points. In the absence of the particles 10, fissures 84 could close back up after the fracturing water leaves. However, by containing the particles 10, the individual substrates 12 are themselves rock in the form of sand, ceramic sand, or the like. Thus, a particle 10 need only obstruct the ability of the fissure 84 to close, and it may "prop" open the fissures 84 precluding the rock 86 or the pieces of rock 86 from settling back into alignment with one another.

Thus, the particles 10 both alone and in collected piles act as proppants left behind by the fluid flow 82, by virtue of the particles 10B captured. As a practical matter, it is only the substrate 12 that acts as a proppant. The polymer 18 may eventually be worn off but can easily be compressed, distorted, or cut. Regardless, as the fissures 84 open, they are back filled and close in at choke points and settling points collecting the substrate 12.

Figure 7:
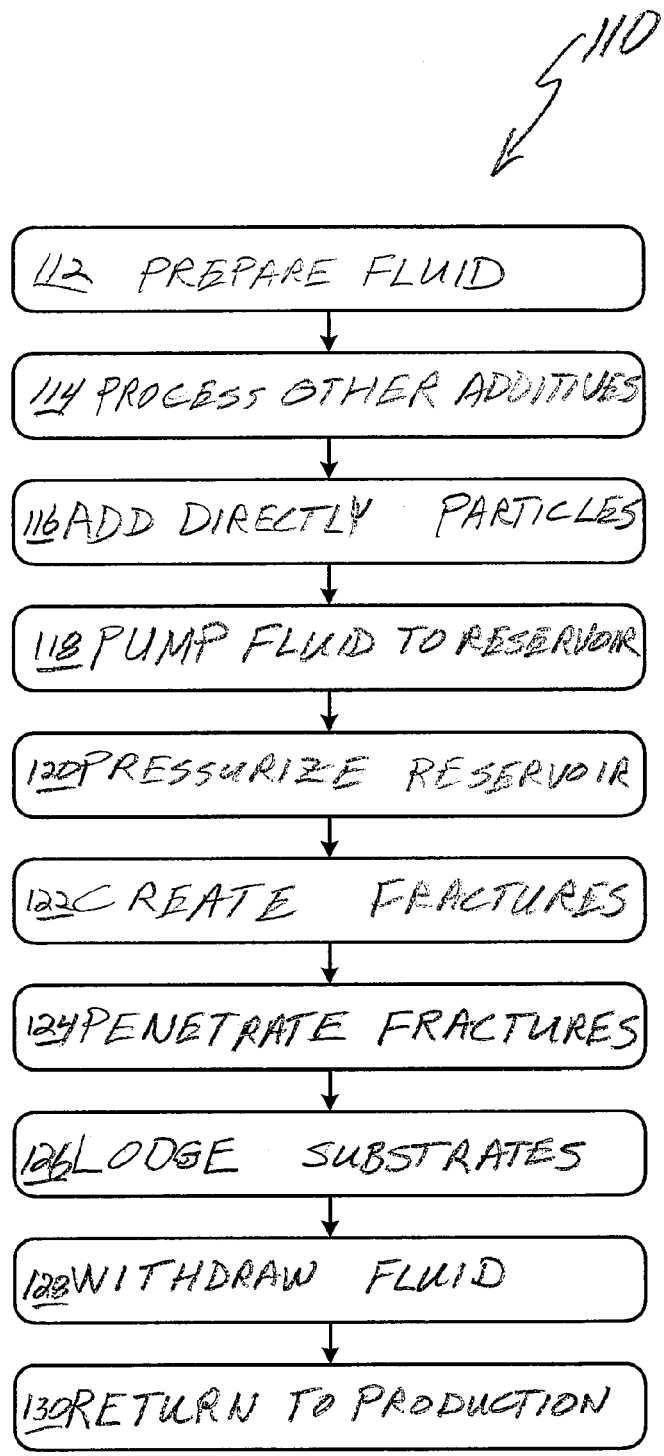
FIG. 7 is a schematic block diagram of a fracturing and propping process using compositions and methods in accordance with the invention.

Referring to FIG. 7, a process 10 may include preparing 112 a fluid 82. Processing 114 other additives other than the particles 10 may be done according to any suitable methods, including prior art processes. Adding 116 directly to the fluid 82, the particles 10 as described hereinabove, may be done in such a manner that the operators need not wait for absorption or any other processes to take place. Additional energy for elevating temperature is not required, neither mixing or the like, other than adding 116 directly particles 10 in to the flow 82. The flow 82 will immediately grab the particles 10 according the principles of fluid dynamics in which fluid drag is dependent upon a shape factor of the particle 10, the density of the fluid 82, the square of velocity of the fluid, and so forth, as defined in engineering fluid mechanics.

The fluid 82 now bearing the particles 10 would be immediately pumped 118 into the formation 80 that is the reservoir 80 of 8 and oil field. Eventually, pressurizing 120 the reservoir by pressurizing the fluid 82 results in creating 122 fractures 84 or fissures 84 within the formation 80 by breaking up the rock 86 of the formation 80. A fracture 84 with enough displacement may make a site for material 10 to stagnate and collect.

Creating 122 fracture lines throughout the formation 80 is followed by penetrating 124, by the particles 10 borne in the fluid 82 into the passages 84 or fissures 84 in the rock 86 of the formation 80. Whenever the flow 82 of fluid 82 carries a particle 10 to a choke point 108 in a passage 84, as illustrated in FIG. 6, a particle 10 will be lodged as illustrated in the inset of FIG. 6, a particle 10 with its polymer 18 still secured and intact may be lodged. Similarly, the substrate 12 may be lodged 126 and the polymer 18 may stripped therefrom by the consequent or subsequent flowing of material in the flow 82. Likewise, piles of stagnant particles 10 may backfill spaces, precluding rock 86 settling back in.

After the lodging 126 or propping 126 of the fissures 84 by the substrate 12, in the particles 10, the passages 84 will remain open. These fissures 84 may then be used to later withdraw 128 the fluid 82 from the formation 80. Thereafter, returning 130 the formation 80 to production may occur in any manner suitable. For example, heat may be added to the formation, liquid may be run through the formation as a driver to push petroleum out, or the like.

As discussed above, the material 10 may be utilized as self-suspending proppants in hydraulic fracturing. As used herein, the material 10 may also be referred to as self-suspending proppants.

Methods for Forming Self-Suspending Proppant Particles

In various embodiments, as discussed above, the self-suspending proppants described herein may include a substrate, e.g., sand, having an outer polymeric coating that is water-absorbing. In addition, in such embodiments, as discussed above, the self-suspending proppants may include a binder, which may aid in securing at least a portion of the water-absorbing polymeric coating to the substrate.

In certain embodiments, the substrate can include frac sand. In one or more embodiments, the frac sand can be graded as a 12-20 mesh frac sand, a 16-30 mesh frac sand, a 20-40 mesh frac sand, a 30-50 mesh frac sand, a 40-70 mesh frac sand, or a 100 mesh frac sand. Such frac sands and grades are commercially available.

Methods for Forming Self-Suspending Proppant Particles: Binder-Coated Substrate Particles In embodiments, as discussed above, the self-suspending proppants can be made by mixing a substrate with a binder to form binder-coated substrate particles. In certain embodiments, the binder may be a liquid binder, such as glycerol. Other liquid binders are described above.

In one or more embodiments, when mixing a binder with a substrate, one may add at least about 0.05 wt. % binder, at least about 0.1 wt. % binder, at least about 0.15 wt. % binder, or at least about 0.2 wt. % binder; and/or less than about 3 wt. % binder, less than about 2 wt. % binder, less than about 1 wt. % binder, or less than about 0.5 wt. % binder. In the same or alternative embodiments, when mixing a binder with a substrate, one may add about 0.25 wt. % binder. As used herein, "wt. % binder" refers to the ratio of the weight of the binder to the weight of the substrate, multiplied by 100.

In embodiments, the binder and substrate can be mixed using any commercially available mixing device or mixing vessel and a particular one can be chosen by one skilled in the art for a specific purpose. In certain embodiments, a ribbon mixer or paddle mixer may be utilized when mixing the binder and substrate.

In certain embodiments, the binder and substrate may be mixed for a time sufficient to substantially evenly apply the binder to the substrate particles. In one or more embodiments, the binder may be mixed with the substrate for at least about 1-2 minutes.

Methods for Forming Self-Suspending Proppant Particles: Intermediate Polymer-Coated Substrate Particles In embodiments, at least a portion of the binder-coated substrate particles, or substrate particles without binder, may be coated with one or more polymeric materials, such as water-absorbing polymers to form intermediate polymer-coated substrate particles. In one or more embodiments, the water-absorbing polymers utilized to form the intermediate polymer-coated substrate particles can include polyacrylamide, polyacrylates, or a combination thereof. In embodiments, any of the water-absorbing polymers disclosed herein may be linear or cross-linked. In certain embodiments, the water-absorbing polymer can include an anionic polymer, such as polyacrylamide. In such embodiments, the anionic polyacrylamide can have an anionic charge in an amount of about 10 mol %, about 20 mol %, about 30 mol %, about 40 mol % or about 50 mol %. In the same or alternative embodiments, the water-absorbing polymer can include a non-ionic polymer, cationic polymer, anionic polymer, or a combination thereof. It is appreciated that one skilled in the art is aware that such types of water-absorbing polymers can be commercially obtained. Representative commercial vendors includes SNF and Evonik.

In certain embodiments, coating the binder-coated substrate particles with one or more polymeric materials to form intermediate polymer-coated substrate particles can include applying one or more polymeric materials to a mixing vessel or device containing binder-coated substrate particles, such as the mixing devices discussed above.

In certain embodiments, the water-absorbing polymers may be suspending in liquid prior to being added to a mixing vessel containing the substrate particles or binder-coated substrate particles. In one or more embodiments, the water-absorbing polymer may be present in a water-in-oil emulsion (i.e., an invert emulsion). In such embodiments, the water-in-oil emulsion may include the water-absorbing polymer in the water or aqueous phase, which is emulsified in the larger oil phase, such as a mineral oil. In addition, in such embodiments, the water-absorbing polymer may be present in the water-in-oil emulsion in an amount of about 15 wt. %, about 20 wt. %, about 25 wt. %, about 30 wt. %., about 40 wt. %, or about 50 wt. %. It is appreciated that one skilled in the art understands that water-in-oil emulsions comprising water-absorbing polymers can be commercially obtained. One such commercial vendor is SNF.

In one or more embodiments, when a water-in-oil emulsion is utilized, the emulsion can be added to the binder-coated substrate, or plain substrate, in an amount of at least about 0.1 wt. % emulsion relative to the weight of the substrate, at least about 0.2 wt. %, at least about 0.3 wt. %, at least about 0.4 wt. %, at least about 0.5 wt. %, at least about 1 wt. %, at least about 2 wt. %, at least about 2.5 wt. %, at least about 3 wt. %, at least about 4 wt. %, at least about 5 wt. %, or at least about 7.5 wt. %. In the same or alternative embodiments, the emulsion can be added to the binder-coated substrate, or plain substrate, in an amount of less than about 20 wt. % emulsion relative to the weight of the substrate, less than about 15 wt. %, or less than about 10 wt. %. As used herein, "wt. % emulsion relative to the weight of the substrate" refers to the ratio of the weight of the emulsion to the weight of the substrate, multiplied by 100.

In certain embodiments, the water-absorbing polymer may be mixed with the binder-coated substrate particles, or substrate particles, for a time sufficient to substantially evenly apply the water-absorbing polymer, or the liquid or emulsion containing the water-absorbing polymer, to the substrate particles to form the intermediate polymer-coated substrate particles. In one or more embodiments, the intermediate polymer-coated substrate particles can be fully coated with water-absorbing polymer and/or the liquid or emulsion containing the water absorbing polymer. In one or more embodiments, the water absorbing polymer may be mixed with the substrate for about 1-0 minutes, or about 2-3 minutes.

Methods for Forming Self-Suspending Proppant Particles: Polymer-Coated Substrate Particles In various embodiments, the intermediate polymer-coated substrate particles can be coated with a second water-absorbing polymer to form polymer-coated substrate particles. In certain embodiments, the second water absorbing polymer can have any or all of the parameters and properties of the water absorbing polymers described above. In various embodiments, the water-absorbing polymer applied to the intermediate polymer-coated substrate particles can include an acrylamide and acrylate co-polymer that is cross-linked. In the same or alternative embodiments, the water-absorbing polymer applied to the intermediate polymer-coated substrate particles can include a linear polyacrylamide. In such embodiments, the linear polyacrylamide applied at this step may have an increased molecular weight relative to the water-absorbing polymer applied in forming the intermediate polymer-coated substrate particles.

In one or more embodiments, the polymer coated substrate particles can be formed by applying the second water-absorbing polymer to the intermediate polymer-coated substrate particles in a mixing vessel, such as the mixing vessels discussed above.

In certain embodiments, the second water-absorbing polymer may be present in powdered form when applying to the intermediate polymer-coated substrate particles. In certain embodiments, a water-absorbing polymer in powdered form refers to a dry powdered polymer with powder particles of less than about 300 microns, less than about 200 microns, or less than about 100 microns. In the same or alternative embodiments, a water-absorbing polymer in powdered form refers to a dry powdered polymer having a dry content of: at least about 50%, at least about 75%, at least about 85%, at least about 95%, or at least about 99%; or a dry content of from about 75%-100% or about 88%-100%. In embodiments, the processes described above for forming the intermediate polymer-coated substrate particles may result in the intermediate polymer-coated substrate particles having an outer wet surface, due to the application of the binder and/or the application of a water absorbing polymer in a liquid, such as an emulsion described above. In such embodiments, a dry powdered second water-absorbing polymer may adhere to the wet outer surface of the intermediate polymer-coated substrate particles.

In one or more embodiments, the second water-absorbing polymer may be applied in an amount so as to not completely, or discontinuously, cover or coat the outer surface of the intermediate polymer-coated substrate particles. In alternative embodiments, the second water-absorbing polymer may be applied in an amount so as to substantially coat or cover the outer surface of the intermediate polymer-coated substrate.

In certain embodiments, the second water-absorbing polymer may be applied in an amount of at least about 0.01 wt. % water-absorbing polymer relative to the weight of the substrate, at least about 0.1 wt. %, at least about 0.25 wt. %, at least about 0.5 wt. %, at least about 1 wt. %, at least about 1.5 wt. %, or at least about 2 wt. %; and/or less than about 10 wt. %, less than about 7.5 wt. %, less than about 5 wt. %, or less than about 3 wt. %. As used herein, "wt. % water-absorbing polymer relative to the weight of the substrate" refers to the ratio of the weight of the second water-absorbing polymer to the weight of the substrate, multiplied by 100.

In embodiments, the second water-absorbing polymer may be mixed with the intermediate polymer-coated substrate particles to form polymer-coated substrate particles for a time sufficient to evenly distribute the second water-absorbing polymer amongst the volume of intermediate polymer-coated substrate particles. In certain embodiments, the second water-absorbing polymer may be mixed with the intermediate polymer-coated substrate particles for less than about 5 minutes, less than about 4 minutes, less than about 3 minutes, less than about 2 minutes, or less than about 1 minute.

Methods for Forming Self-Suspending Proppant Particles: Optional Third Application of Water-Absorbing Polymer In one or more embodiments, a third application of water-absorbing polymer may be optionally applied to the polymer-coated substrate particles. In such embodiments, this optional application of the water-absorbing polymer can include any or all of the properties and parameters discussed above in applying the water-absorbing polymer to the binder-coated substrate particles to form the intermediate polymer-coated substrate particles. For example, in various embodiments, this third application of water-absorbing polymer can included mixing a water-in-oil emulsion comprising a water-soluble polymer with the polymer-coated substrates in a mixing vessel for 2-3 minutes.

Methods for Forming Self-Suspending Proppant Particles: Drying the Polymer-Coated Substrate In embodiments, the polymer-coated substrate, with or without the third application of water-absorbing polymer, can be dried in order to form self-suspending proppant particles. In such embodiments, this drying step can remove at least a portion of the liquid with which water-absorbing polymer was suspended during application of the water-absorbing polymer to the substrate, such as that described above with reference to the formation of intermediate polymer-coated substrate particles.

In certain embodiments, the polymer-coated substrate can be exposed to mild heat, such as a temperature of at least about 100° F., or at least about 150° F.; and/or less than about 300° F., less than about 250° F., or less than about 225° F. In embodiments, the drying temperature can be about 200° F. or less than about 230° F. Any type of oven or drying system, e.g., fluid bed dryer, can be used to dry the polymer-coated substrate, and a particular system can be chosen by one skilled in the art for a specific purpose. The polymer-coated substrate can be exposed to mild heat for at least about 10 minutes, at least about 20 minutes, or at least about 30 minutes.

Methods for Forming Self-Suspending Proppant Particles: Addition of a Flowing Agent In various embodiments, once the polymer-coated substrate particles are dried thereby forming the self-suspending proppant particles, a flowing agent may be added to the self-suspending proppant particles to aid in handling and distribution of the self-suspending proppant particles in humid environments. In embodiments, the flowing agent can include fumed silica, sodium aluminosilicate, or a combination thereof. In certain embodiments, other commercially available flowing agents can be used. A non-limiting list of other commercially available flowing agents includes potassium aluminum silicate, silicon dioxide, calcium silicate, and powdered cellulose.

In embodiments, at least about 0.05 wt. % flowing agent relative to the weight of self-suspending proppant particles can be mixed with or added to the self-suspending proppant particles, at least about 0.1 wt. %, at least about 0.25 wt. %, at least about 0.5 wt. %, at least about 0.75 wt. %, or at least about 1 wt. %, and/or less than about 5 wt. %, less than about 4 wt. %, less than about 3 wt. %, or less than about 2 wt. %. In certain embodiments, about 0.1 wt. % flowing agent relative to the weight of self-suspending proppant particles can be added, about 0.25 wt. %, about 0.5 wt. %, about 0.75 wt. %, about 1 wt. %, about 2 wt. %, about 3 wt. %, about 4 wt. %, or about 5 wt. %.

Self-Suspending Proppant Particles

As discussed above, the self-suspending proppant particles described herein can include a substrate, e.g., sand particle, having an outer polymeric coating. In embodiments, the outer polymeric coating can be discontinuous. As used herein a discontinuous outer polymeric coating refers to the a polymeric coating on an outer surface of a substrate (that is or is not coated in binder) that covers less than about 80% of the surface, less than about 70%, less than about 60%, less than about 50%, or less than about 25%. In an alternative embodiment, the outer polymeric coating can be a continuous outer coating.

In embodiments, the self-suspending proppant particles made according to the methods described above can include more than one application of a water-absorbing polymer to form the outer polymeric coating. In certain embodiments, as discussed above, the self-suspending proppant particles can include a first water-absorbing polymer that may be applied to a substrate particle, or binder-coated substrate particle, and a second water-absorbing polymer that may be applied to the intermediate polymer-coated substrate particles.

In certain embodiments, the combined amount of the first water-absorbing polymer applied to the binder-coated substrate particles and the second water-absorbing polymer applied to the intermediate polymer-coated substrate particles can provide an outer polymeric coating weight (or coat weight) to the self-suspending proppant particles of at least about 0.5 wt. % coat weight, at least about 1.0 wt. %, at least about 1.5 wt. %, at least about 2.0 wt. %, at least about 2.5 wt. % or at least about 3.0 wt. %, and/or less than about 7.5 wt. %, less than about 5.0 wt. %, or less than about 4 wt. %. As used herein, wt. % coat weight refers to the ratio of the total weight of the water-absorbing polymer applied to substrate, to the weight of the substrate, multiplied by 100.

In various embodiments, the first and second water absorbing polymers can be different from one another. For example, in one embodiment, the first and second water absorbing polymers can be different polyacrylamide polymers of different molecular weights. In such an embodiment, the second water-absorbing polymer, e.g., polyacrylamide polymer, may have a higher molecular weight than the first water-absorbing polymer, e.g., a polyacrylamide polymer.

In certain embodiments, the first and second water-absorbing polymers can be different types of polymers, or similar types of polymers with different properties. For example, the first and second water-absorbing polymers can be the same types of polymers, e.g., polyacrylamides, but one may be a linear, non-cross-linked polymer, and the other polymer may be cross-linked. In another example, the first and second water-absorbing polymers can be different types of polymers, such as one being a polyacrylamide and the other being a polyacrylate or co-polymer of acrylate and acrylamide.

In embodiments, the ability to vary the types or properties of the water-absorbing polymers applied to the substrate can impart various beneficial properties to the self-suspending proppant particles. For example, in certain embodiments, by using a cross-linked water-absorbing polymer for at least one of the water-absorbing polymers in the outer polymeric coating one can increase the ability for such a self-suspending proppant particle to remain suspending in brackish water conditions that may be found in various wells.

In one embodiment, a self-suspending proppant having a first water-absorbing polymer comprising linear polyacrylamide (which may be applied via a water-in-oil emulsion) and a second water-absorbing polymer comprising a cross-linked polymer, such as crosslinked polyacrylate or a cross-linked co-polymer of acrylamide and acrylate (which may be applied by to the substrate in powdered form) can greatly increase the suspension of the proppant in various types of salt or brackish water.

In one or more embodiments, the self-suspending proppants made as described herein may remain suspended in a 1000 ppm $CaCO_3$ aqueous solution for at least 30 minutes, at least 60 minutes, at least 90 minutes, or at least 120 minutes, at room temperature or, alternatively at a temperature of 170° F., after adding the self-suspending proppant particles to the salt solution and shaking to incorporate.

In certain embodiments, a breaker, such as ammonium persulfate or sodium chlorite, may be present at varying levels in a suspension test, such as that described above. The addition of a breaker may be utilized to determine if the proppant will become suspended, or if already suspended, to determine if the suspended proppant can be "broken" (and settle out). In embodiments, the breaker may be present in an amount of from 1-100 pounds per thousand gallons.

In certain embodiments, by varying the types and/or properties of the first and second water-absorbing polymers utilized in forming the self-suspending proppant particles one may be able to tailor a particular type of self-suspending proppant particle for a particular type of water, such as water containing cations, chlorine, iron, or other ionic components.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The concepts discussed herein will be further described in the following examples, which do not limit the scope of various embodiments described in the claims.

EXAMPLES

Example 1: Effect of Various Brackish Well Waters on Specific Self-Suspending Proppants In this Example, various self-suspending proppants were made and analyzed for their ability to remain suspended in various brackish water samples from fracking wells. Each of the proppants tested in this method have been made according to the methods described above. For example, frac sand (40-70 mesh frac sand, unless otherwise noted below) was added to a mixing device, e.g., a kitchen mixer, and 0.20 wt. % glycerol was added and allowed to mix for two to three minutes. Then a water-in-oil emulsion containing a linear polyacrylamide was added and allowed to mix for two to three minutes, followed by the addition of another linear polyacrylamide in powder form, which was mixed in for a period of two to three minutes. The amounts of water-in-oil emulsion and powdered linear polyacrylamide that were added in the various samples are provided below in Table 1.

The proppants were then dried at about 230° F. for 15-20 minutes in an electric frying pan.

TABLE 1

Water-absorbing polymers components in self-suspending proppant samples

| Sample | Water-absorbing polymer coat weight (wt. %)* | Emulsion | Amount of emulsion (wt. %) | Amount of Powdered polyacrylamide (Hyperfloc ® AF 308 product) (wt. %) |
|---|---|---|---|---|
| A | 1.5 | Hyperfloc ® AE 873H | 3.33 | 0.5 |
| B | 2.0 | Hyperfloc ® AE 853H | 3.33 | 1.0 |
| C (30-50 mesh frac sand) | 2.5 | Hyperfloc ® AE 853H | 3.33 | 1.5 |
| D | 2.0 | Hyperfloc ® AE 852 | 3.33 | 1.16 |
| E | 1.5 | Hyperfloc ® AE 859 | 2.0 | 0.5 |
| F | 1.5 | Hyperfloc ® AE 872 | 3.33 | 0.66 |

*wt. % of coat weight refers to the ratio of the weight of the water absorbing polymer added (from both the emulsion and the powdered polyacrylamide) to the weight of the frac sand, multiplied by 100. The weight of water absorbing polymer from the emulsion was determined based on the weight percent of polyacrylamide in the emulsion. The emulsions and powdered polyacrylamide were obtained from SNF.

11.88 grams of each of the self-suspending proppants was added to 45 mL of various test waters in a 50 mL tube (2.2 ppg), capped, and then shaken by hand vigorously for thirty seconds. The shaken tubes were observed over time the settling of the self-suspending proppants. The results appear below in Tables 2-4.

TABLE 2

Suspension results in brackish well water sample #1

Well water sample # 1: 11.73 mS conductivity and pH of 8.34

| Sample | First reading: Time and Suspension Level* | Second reading: Time and Suspension Level* | Third reading: Time and Suspension Level* | Fourth reading: Time and Suspension Level* | Fifth reading: Time and Suspension Level* |
|---|---|---|---|---|---|
| A | 0 min.-100% (6 mL) | 5 min.- 37 mL | 18 min.- 42 mL | 60 min.- 43 mL | 120 min.- 44 mL |
| B | 0 min.-100% (6 mL) | 5 min.- 22 mL | 10 min.- 25 mL | 47 min.- 27 mL | 107 min.- 28 mL |
| C | 0 min.-100% (6 mL) | 58 min.- 28 mL | n/a | n/a | n/a |
| D | 0 min.-100% (6 mL) | 5 min.- 20 mL | 10 min.- 25 mL | 42 min.- 28 mL | 102 min.- 33.5 mL |
| E | 0 min.-100% (6 mL) | 5 min.- 31 mL | 37 min.- 34 mL | 97 min.- 35 mL | n/a |
| F | 0 min.-100% (6 mL) | 32 min.- 45 mL | 92 min.- 46 mL | n/a | n/a |

*Suspension level was visually determined based on the position of the top of the suspended proppants in the brackish well water sample #1. For example, 100% suspended refers to seeing no settled proppant and the position of the top of the suspended proppants is approximately at the 6 mL level, as determined based on the graduations on the tube. 28 mL is determined to be 50% suspended.

TABLE 3

Suspension results in brackish well water sample #2
Well water sample # 2: 1024 µS conductivity and pH of 7.83

| Sample | First reading: Time and Suspension Level* | Second reading: Time and Suspension Level* | Third reading: Time and Suspension Level* | Fourth reading: Time and Suspension Level* |
|---|---|---|---|---|
| A | 0 min.-100% (6 mL) | 44 min.- 10 mL | 18 min.- 42 mL | 60 min.- 43 mL |
| B | 0 min.-100% (6 mL) | 5 min.- 6 mL | 49 min.- 7 mL | n/a |
| C | 0 min.-100% (6 mL) | 7 min.- 1 mL | 63 min.- 15 mL | n/a |
| D | 0 min.-100% (6 mL) | 5 min.- 6 mL | 53 min.- 7 mL | n/a |
| E | 0 min.-100% (6 mL) | 5 min.- 8 mL | 12 min.- 11 mL | 60 min.- 28 mL |
| F | 0 min.-100% (6 mL) | 4 min.- 30 mL | 11 min.- 33 mL | 64 min.- 41 mL |

*Suspension level was visually determined based on the position of the top of the suspended proppants in the brackish well water sample #2. For example, 100 % suspended refers to seeing no settled proppant and the position of the top of the suspended proppants is approximately at the 6 mL level, as determined based on the graduations on the tube. 28 mL is determined to be 50% suspended.

TABLE 4

Suspension results in brackish well water sample #3
Well water sample #2: 3.62 mS conductivity and pH of 8.27

| Sample | First reading: Time and Suspension Level* | Second reading: Time and Suspension Level* | Third reading: Time and Suspension Level* | Fourth reading: Time and Suspension Level* |
|---|---|---|---|---|
| C | 0 min.-100% (6 mL) | 3 min.- 21 mL | 24 min.- 21 mL | 92 min.- 26 mL |

*Suspension level was visually determined based on the position of the top of the suspended proppants in the brackish well water sample

TABLE 5

Suspension results in fresh water sample
Fresh Water Sample: 2.43 mS conductivity and pH of 8.05

| Sample | First reading: Time and Suspension Level* | Second reading: Time and Suspension Level* | Third reading: Time and Suspension Level* |
|---|---|---|---|
| C | 0 min.-100% (6 mL) | 21 min.- 16 mL | 90 min.- 24 mL |

*Suspension level was visually determined based on the position of the top of the suspended proppants in the fresh water sample. For example, 100 % suspended refers to seeing no settled proppant and the position of the top of the suspended proppants is approximately at the 6 mL level, as determined based on the graduations on the tube. 28 mL is determined to be 50% suspended.

As can be seen in the above results, Samples B and C, which included the same water-absorbing polymers, just with varying coat weight, unexpectedly appeared suspended longer than the other samples (aside from Sample D). For example in brackish water samples #1 and #2, at least 50% of Samples B and C were suspended after about one hour subsequent to shaking. Further, Sample C performed equally as well in brackish water sample #3 and the fresh water sample. In any of the four water samples tested, Sample C was not observed to be less than 50% suspended within the observed timeframe. Although Sample D stayed almost 100% suspended in brackish water sample #2 about 60 minutes after shaking, the same sample was observed to be less than 50% suspended in brackish water sample #1 after about 102 minutes.

Example 2: Self-Suspending Proppants in 1000 ppm $CaCO_3$

In this Example, the suspension of various self-suspending proppants were analyzed in 1000 ppm $CaCO_3$. In this Example two main samples were utilized, a self-suspending proppant having a cross-linked water-absorbing polymer and another self-suspending proppant with only linear water-absorbing polymers. The self-suspending proppant having only linear water-absorbing polymers was made as described in Example 1 with reference to Sample B.

For the self-suspending proppant having a cross-linked water-absorbing polymer, frac sand (40-70 mesh) was added to a mixing device, a kitchen mixer, and 0.26 wt. % glycerol was added and allowed to mix for less than two minutes. Then 0.45 wt. % SNF Hyperfloc® AE 873H linear polyacrylamide emulsion was added and allowed to mix for two to three minutes, followed by the addition of 2 wt. % of an acrylamide and potassium acrylate co-polymer, cross-linked (Evonik Industries Stockosorb® S 18G) in powder form, which was mixed in over a period of about five minutes. Next an additional 0.45 wt. % % SNF Hyperfloc® AE 873H linear polyacrylamide emulsion was added and allowed to mix for two to three minutes. The proppants were then dried at 200° F. for 30 minutes in a conventional oven and 0.5 wt. % fumed silica was added.

Approximately the same amount of proppants were added to separate vials containing a 1000 ppm $CaCO_3$ solution and shaken vigorously for thirty seconds and allowed to sit in an oven at a temperature of 170° F. for 75 minutes. An additional vial contained the linear polyacrylamide self-suspending proppant and the same 1000 ppm $CaCO_3$ solution along with a breaker and was treated similarly. After 75 minutes at 170° F., both self-suspending proppants remained suspended in the brackish conditions. In addition, the vial containing the linear polyacrylamide self-suspending proppant and the breaker settled out, suggesting that such an outer polymeric coating can be "broken" with a breaker to settle out the proppant. The cross-linked self-suspending proppant was not exposed to the breaker.

Example 3: Effects of Various Flowing Agents on Self-Suspending Proppants in Humid Conditions In this Example, various flowing agents were tested with a self-suspending proppant in humid conditions to test for flowability and water absorption. Table 6 below lists the various self-suspending proppant samples and the various flow treatments.

TABLE 6

Flowability Test Proppant Samples

| Sample | Base Sand (mesh) | Coating Mixture | Drying Profile | Flow Agent | Flow Agent (wt. %) | Mix sand (wt. %) |
|---|---|---|---|---|---|---|
| A | 30/50 | A-1.5% | 220° F.-15 min | None | — | 40/70-10% |
| B | 30/50 | A-1.5% | 220° F.-15 min | E-554 | 0.50% | — |
| C | 40/70 | A-1.5% | 220° F.-15 min | DFC | 0.17% | — |
| D | 40/70 | A-1.5% | None | E-554 | 0.50% | — |
| E | 40/70 | A-1.5% | 220° F.-15 min | Whey | 1.00% | — |
| F | 30/50 | A-1.5% | 220° F.-15 min | WPC 34 | 1.00% | — |
| G | 30/50 | A-1.5% | None | Whey | 1.00% | — |
| H | 40/70 | A-1.5% | None | WPC 34 | 1.00% | — |
| I | 40/70 | A-1.5% | None | E-554 | 1.00% | — |
| J | 40/70 | A-1.5% | None | E-554 | 2.00% | — |

TABLE 6-continued

Flowability Test Proppant Samples

| Sample | Base Sand (mesh) | Coating Mixture | Drying Profile | Flow Agent | Flow Agent (wt. %) | Mix sand (wt. %) |
|---|---|---|---|---|---|---|
| K | 30/50 | A-1.5% | 220° F.-15 min | None | — | — |
| L | 30/50 | A-1.5% | 220° F.-15 min | E-554 | 1.00% | — |
| M | 40/70 | A-1.5% | 220° F.-15 min | DFC | 0.12% | — |
| N | 40/70 | A-1.5% | 220° F.-15 min | Whey | 1.50% | — |
| O | 40/70 | A-1.5% | 220° F.-15 min | WPC 34 | 1.50% | — |
| P | 40/70 | A-1.5% | 220° F.-15 min | F | 0.10% | — |
| Q | 40/70 | A-1.5% | 220° F.-15 min | F | 0.15% | — |
| R | 40/70 | A-1.5% | None | None | — | — |

The proppant samples listed in Table 6 were prepared as described above with respect to sample A of Table 1 in Example 1 to give a coated sand with a 1.5% by weight outer polymeric coating. The same polyacrylamides utilized in sample A of Table 1 in Example 1 were utilized. However, the drying protocol differed as described in Table 6, for example some of the samples were dried with a standard temperature profile, while some were not heat treated. Some of the samples were treated with a flow agent product, as listed in Table 6. Some of the samples were mixed with uncoated sand. The "E-554 (Zeolex 23A)" flow agent is a sodium aluminosilicate purchased from J.M. Huber Corporation. The "F" flow agent is Aerosil R202 fumed silica purchased from Evonik Corporation. The "WPC 34" is a whey protein concentrate at 34% that is commercially available. The "whey" is commercially available. DFC is a proprietary coating utilized to provide a dust-free frac sand.

First, the various proppant samples were exposed to a humidity chamber. Specifically, the samples prepared as in Table 6 were added to an open vial and weighed. Then, the vials were exposed to 85% relative humidity at 90° F. for 15 minutes and weighed thereafter. The temperature and humidity were verified by sensor recordings. The results are listed in Table 7 below.

TABLE 7

Humidity Testing in vials

| Sample | Weight when prepared (g) | Pre-Trial Weight (g) | Post-Trial Weight (g) | Trial Weight Gain (g) |
|---|---|---|---|---|
| A | 41.23 | 41.23 | 41.24 | 0.01 |
| B | 42.94 | 42.93 | 42.95 | 0.02 |
| C | 39.52 | 39.52 | 39.53 | 0.01 |
| D | 35.82 | 35.81 | 35.81 | 0 |
| E | 41.95 | 41.94 | 41.95 | 0.01 |
| F | 42.3 | 42.29 | 42.31 | 0.02 |
| G | 31.91 | 31.92 | 31.92 | 0 |
| H | 30.56 | 30.57 | 30.56 | −0.01 |
| I | 36.74 | 36.74 | 36.74 | 0 |
| J | 39.63 | 39.62 | 39.63 | 0.01 |
| K | 40.65 | 40.65 | 40.65 | 0 |
| L | 41.05 | 41.04 | 41.06 | 0.02 |
| M | 43.13 | 43.11 | 43.11 | 0 |
| N | 41.61 | 41.6 | 41.62 | 0.02 |
| O | 39.02 | 39.02 | 39.04 | 0.02 |
| P | 38.01 | 38.02 | 38.02 | 0 |
| Q | 37.88 | 37.88 | 37.9 | 0.02 |
| R | 29.95 | 29.9 | 29.9 | 0 |

Figure 8:
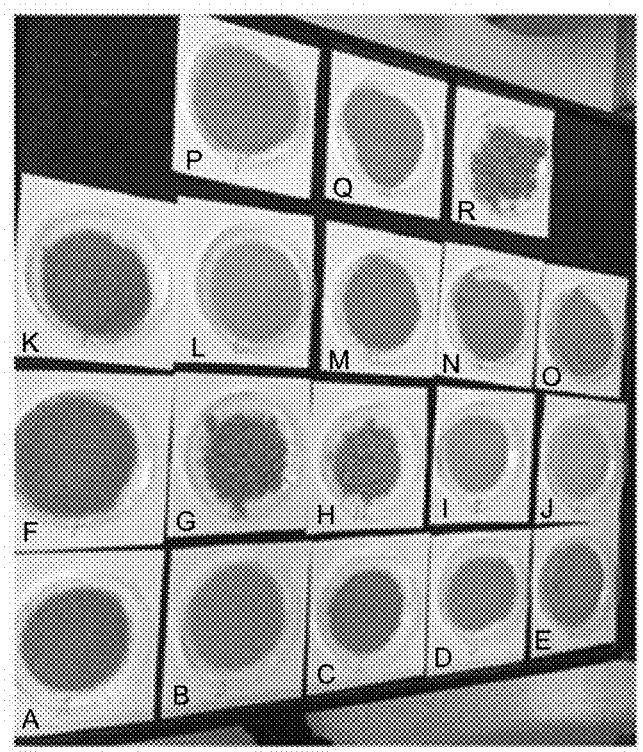
FIG. 8 is an image of various self-suspending proppants in the presence of various flowing agents after being exposed to heat and humidity as described in Example 3.

Next, the samples exposed to the humidity chamber as above were tested for their ability to flow out of a vial. Specifically, each sample vial was emptied into the Petri dish. The number of shakes/taps of the upside-down vial required to empty the sand from the vial to the Petri dish were recorded. Each time further agitation is required to break up sand clumps add 25 shakes/taps to the count. If the equivalent of 100 or more shakes are required, record 100 shakes/taps and empty the remaining contents into the Petri Dish by any means. 4. If a surface clump was formed on the top exposed surface of the vial, record the relative size of the surface clump. The level of bulk clumping visible in each sample, and whether the sand of the sample is uniformly sticking together was recorded. The results appear in Table 8 below and FIG. 8 shows the images of the petri dishes.

TABLE 8

Flow testing from vials

| Sample | Shake/Tap Scale | Surface Clump | Bulk | Sticky |
|---|---|---|---|---|
| A | 5 | Medium | | |
| B | 5 | Medium | | |
| C | 10 | Medium | Small | |
| D | 1 | | Small | |
| E | 5 | Medium | | |
| F | 2 | | | |
| G | 100 | Bulk | Large | Yes |
| H | 75 | Bulk | Large | Yes |
| I | 0 | | | |
| J | 0 | | | |
| K | 3 | Small | Small | |
| L | 1 | | | |
| M | 0 | | Small | |
| N | 2 | Large | | |
| O | 8 | Large | Small | |
| P | 1 | | Small | |
| Q | 1 | | Small | |
| R | 100 | Bulk | Large | Yes |

Next the petri dishes from FIG. 8 containing the samples A-R, were subjected to the humidity chamber again, this time for 60 minutes at 90° F. with 85% relative humidity. The temperature and humidity were verified by sensor recordings. The petri dishes were weighed before and after this humidity chamber exposure. The results are listed in Table 9 below.

TABLE 9

Humidity testing in petri dish

| Sample | Pre-Trial Weight (g) | Post-Trial Weight (g) | Trial Weight Gain (g) |
|---|---|---|---|
| A | 40.62 | 40.88 | 0.26 |
| B | 42.29 | 42.55 | 0.26 |
| C | 38.87 | 39.1 | 0.23 |
| D | 35.12 | 35.17 | 0.05 |
| E | 41.36 | 41.65 | 0.29 |
| F | 41.64 | 41.93 | 0.29 |
| G | 31.18 | 31.22 | 0.04 |
| H | 29.91 | 29.92 | 0.01 |
| I | 36.04 | 36.1 | 0.06 |
| J | 38.93 | 38.99 | 0.06 |
| K | 39.97 | 40.16 | 0.19 |
| L | 40.23 | 40.51 | 0.28 |
| M | 42.22 | 42.49 | 0.27 |
| N | 40.84 | 41.13 | 0.29 |
| O | 38.4 | 38.66 | 0.26 |
| P | 37.28 | 37.52 | 0.24 |
| Q | 37.07 | 37.31 | 0.24 |
| R | 28.55 | 28.52 | −0.03 |

Figure 9:
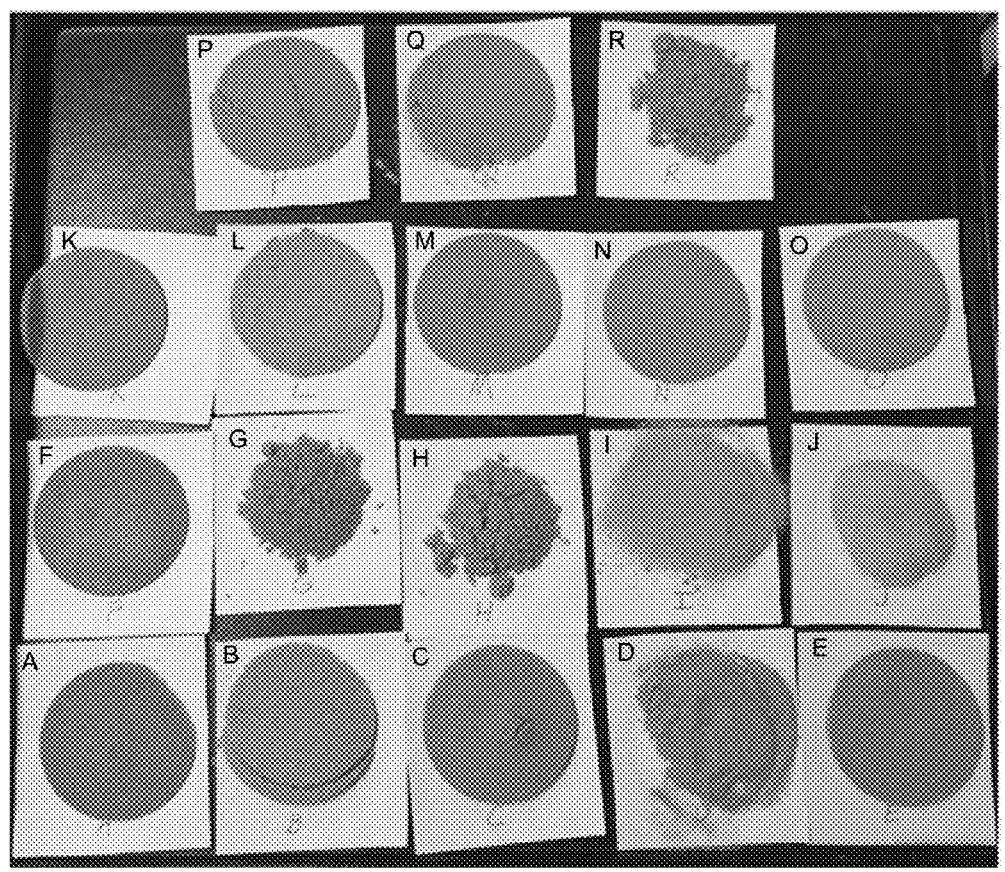
FIG. 9 is an image of the various self-suspending proppants with various flowing agents of FIG. 8 after being exposed to additional heat and humidity as described in Example 3.

The samples in the petri dish were dumped over onto white pieces of paper and are shown in FIG. 9.

Next the samples on the white pieces of paper were evaluated for flowability by being transferred back to their original vials using a plastic funnel. Specifically, an empty funnel was placed into the sample's original sample vial and the sand sample was slid off the paper into the sample funnel. The funnel was shaken vertically 15 times to break up the sand sample in an attempt to have the sand gravity flow into the sample vial. If the humidified sand sample formed a Petri dished shape clump when slid into the funnel, it was noted how easily the clump breaks up when during the shaking. Further, it was noted how easily the sample sand flowed into the vial from the funnel once the initial clump was broken up (if present). The approximate fill volume of sample sand that was returned to each of the original sample vials was recorded. The overall flow and transfer of humid sand was scored according to the following Table 10 and the results are listed in Table 11.

TABLE 10

Scoring for the flow transfer return to vials

| Points Scored | Clump Breakage | Funnel Flow | Vial Fill |
|---|---|---|---|
| 20 | No Clump | | |
| 15 | Very Easy | Very Easy | 90-110% |
| 10 | Easy | Easy | 75-90% |
| 5 | Slightly Difficult | Slightly Difficult | 50-75% |
| 2 | Difficult | Difficult | 25%-50% |
| 1 | Very Difficult | Very Difficult | <25% |
| 0 | No Breakage | No Flow | 0% |

TABLE 11

Flow transfer return from vials

| Sample | Clump Breakage | Funnel Loading Flow | Vial Fill | Score |
|---|---|---|---|---|
| I | No Clump | Very easy | 90-110% | 50 |
| J | No Clump | Very easy | 90-110% | 50 |
| D | No Clump | Easy | 90-110% | 45 |
| B | Very Easy | Easy | 90-110% | 40 |
| L | Very Easy | Easy | 90-110% | 40 |
| P | Very Easy | Easy | 90-110% | 40 |
| Q | Very Easy | Easy | 90-110% | 40 |
| K | Easy | Difficult | 50-75% | 17 |
| O | Slightly Difficult | Difficult | 50-75% | 12 |
| A | Difficult | Difficult | <25% | 5 |
| E | Difficult | Difficult | <25% | 5 |
| F | Difficult | Difficult | <25% | 5 |
| M | Difficult | Difficult | <25% | 5 |
| N | Difficult | Difficult | <25% | 5 |
| C | Very Difficult | Very Difficult | <25% | 3 |
| G | Very Difficult | Very Difficult | <25% | 3 |
| H | Very Difficult | Very Difficult | <25% | 3 |
| R | Very Difficult | Very Difficult | <25% | 3 |

Based on the above results from Tables 7-11 a humidity and flow correlation analysis was performed, which is shown in Table 12.

TABLE 12

Mixture variation performance analysis

| | Drying Profile | | | | | |
|---|---|---|---|---|---|---|
| | 220° F.-15min | | | None | | |
| Flow Agents | Flow Score AVG | Weight Gain AVG | Tap Scale AVG | Flow Score AVG | Weight Gain AVG | Tap Scale AVG |
| E-554 | 40.0 | 0.79% | 3 | 48.3 | 0.19% | 0 |
| sample B | 40.0 | 0.74% | 5 | | | |
| sample D | | | | 45.0 | 0.18% | 1 |
| sample I | | | | 50.0 | 0.21% | 0 |
| sample J | | | | 50.0 | 0.19% | 0 |
| sample L | 40.0 | 0.84% | 1 | | | |
| F | 40.0 | 0.80% | 1 | | | |
| sample P | 40.0 | 0.79% | 1 | | | |
| sample Q | 40.0 | 0.80% | 1 | | | |
| None | 11.0 | 0.67% | 4 | 3.0 | −0.14% | 100 |
| sample A | 5.0 | 0.77% | 5 | | | |
| sample K | 17.0 | 0.58% | 3 | | | |
| sample R | | | | 3.0 | −0.14% | 100 |
| WPC 34 | 8.5 | 0.83% | 5 | 3.0 | 0.04% | 75 |
| sample F | 5.0 | 0.84% | 2 | | | |
| sample H | | | | 3.0 | 0.04% | 75 |
| sample 0 | 12.0 | 0.83% | 8 | | | |
| Whey | 5.0 | 0.85% | 4 | 3.0 | 0.17% | 100 |
| sample E | 5.0 | 0.84% | 5 | | | |
| sample G | | | | 3.0 | 0.17% | 100 |
| sample N | 5.0 | 0.86% | 2 | | | |
| DFC | 4.0 | 0.74% | 5 | | | |
| sample C | 3.0 | 0.72% | 10 | | | |
| sample M | 5.0 | 0.77% | 0 | | | |
| Grand Total | 18.1 | 0.78% | 4 | 25.7 | 0.11% | 46 |

Next various samples were subjected to centrifugal settling. The proppant samples are listed below in Table 13. The samples were made as discussed above with respect to the samples in Table 6.

TABLE 13

Proppant samples for centrifugal compression

| Sample ID | Base Preparation | Flow Agent Added (% by weight) E-554-sodium aluminosilicate |
|---|---|---|
| W | 40/70, A-1.5% coat weight, Undried | 0.5% |
| X | 40/70, A-1.5% coat weight, Undried | 1.0% |
| V | 40/70, A-1.5% coat weight, Undried | 2.0% |

For each of the above samples, a 2.1 g standard method sample was prepared of 40/70 mesh dried sand coated with the standard polymer mixture, dried using the standard temperature profile, and 0.1% weight percent of Product F (fumed silica) added.

2.1 g of each of samples W, X, and V (and the standard samples) was hydrated, by placing it in 8 ml of water inside its own 15 ml centrifuge tube. Each tube was then shaken vigorously to mix the proppant and water mixture and then centrifuged at a low speed for 2-5 minutes. A speed a 13% was used for this testing. The centrifuge was an IEC International Centrifuge Model HT. This centrifuge did not have working instrumentation to show its rotational speed. According to associated literature, this model centrifuge should have a maximum speed of 17,000 RPM and generate a relative centrifugal force of 34375. After spinning at 20% speed the rotor RPM was tested with a separate instrument which gave a value of 3300 RPM. This is consistent with a maximum 100% speed of 17,000 RPM. After centrifuging, the samples were removed and the settling of the materials was compared.

No difference in settling was noted in the samples spun for 5 minutes. The Sample X spun for 3 minutes showed slightly less settling than the standard method sample. The undried samples with the sodium aluminosilicate had more opaque gel layer than that of the standard samples.

Finally, another centrifugal compression test was performed. The samples for this test were prepared according to the below Table 14.

TABLE 14

Centrifuge compression samples

| Sample | Base Sand (mesh) | Coating Mixture | Drying Profile | Flow Agent | Flow Agent Amount | Mix Sand | Taps to Remove |
|---|---|---|---|---|---|---|---|
| B | 30/50 | A-1.5% | 220° F.- 15 min | E-554 | 0.50% | | 1 |
| I | 40/70 | A-1.5% | None | E-554 | 1.00% | | 9 |
| K | 30/50 | A-1.5% | 220° F.- 15 min | None | | 40/70-20% | 0 |
| Q | 40/70 | A-1.5% | 220° F.- 15 min | F | 0.15% | | 3 |

Figure 10A:
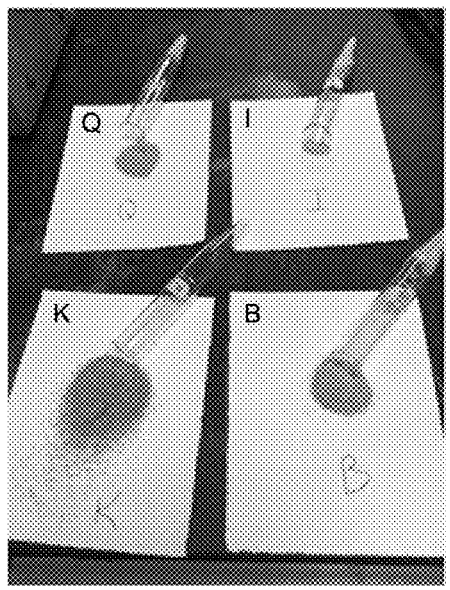
FIG. 10A depicts various self-suspending proppants with various flowing agents after being centrifuged and inverted for an initial attempt to remove the proppants from a centrifuge tube as described in Example 3.
Figure 10B:
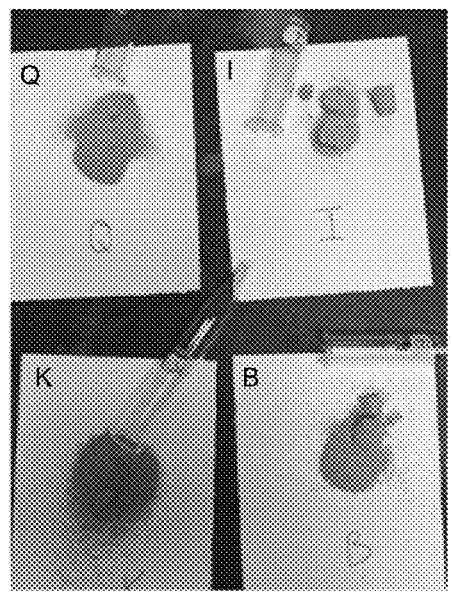
FIG. 10B depicts the self-suspending proppants of FIG. 11A after being removed from the centrifuge tubes.

The samples were prepared as indicated in the Table 14 and according to the procedures set out with respect to Table 6. In this test, 5 ml of each sample proppant was placed into a 15 ml centrifuge tube and centrifuged at a medium or high speed for about 5 minutes (for centrifuge force see the above description with respect to Table 13. The samples were removed and the compaction of the materials was compared. The samples were removed by slowly inverting the centrifuge tube above a white paper. If some compressed sand was stuck in the centrifuge tube, the tube was lightly tapped on the table until the sand was removed. Any required taps in recorded in the above Table 14. FIGS. 10A and 10B show the results of the initial dump (FIG. 10A) and the sand fully removed after tapping (FIG. 10B).

In view of these results of Example 3, the flowing agent that worked the best to promote flowability of the coated sand when exposed to high humidity environments is the sodium aluminosilicate (E-554). Unlike the fumed silica samples, the sodium aluminosilicate-containing samples showed unexpectedly beneficial properties, such as having coated sand product flowability even when added to product that was not heat treated with a drying process.

The amount of water vapor absorbed by the coated sand mixtures was not changed significantly by the flowing agents added. If the coated sand was not heat treated by drying after coating, it didn't absorb as much moisture in the humid environment. When exposed to an environment of 90° F. and 85% relative humidity for 60 minutes the undried samples increased weight an average of 0.1% compared to an average weight increase of 0.8% for the dried samples.

What is claimed is:

1. A method for making self-suspending proppant particles, the method comprising:
    mixing a volume of substrate particles with a liquid binder so that at least a portion of the volume of substrate particles are at least partly covered with the liquid binder on an outer surface, thereby forming binder-coated substrate particles;
    using a water-in-oil emulsion to apply a first water-absorbing polymer to at least a portion of the binder-coated substrate particles so that the at least a portion of the binder-coated substrate particles are at least partly coated with the first water-absorbing polymer, thereby forming intermediate polymer-coated substrate particles, wherein the first water-absorbing polymer is about 30 mol. % anionic or about 40 mol. % anionic;
    coating at least a portion of the intermediate polymer-coated substrate particles with a second water-absorbing polymer to thereby form polymer coated substrate particles; and
    drying the polymer coated substrate particles to remove at least a portion of the water-in-oil emulsion to thereby form self-suspending proppant particles, each of the self-suspending proppant particles at least partly coated with the second water-absorbing polymer,
    wherein, when the self-suspending proppant particles are added to a 1000 ppm $CaCO_3$ aqueous solution and shaken to incorporate, the self-suspending proppant particles remain suspended for at least 30 minutes at room temperature.

2. The method according to claim 1, wherein the first water-absorbing polymer comprises an acrylamide and acrylate co-polymer.

3. The method according to claim 1, wherein the second water-absorbing polymer comprises one of a polyacrylate and an acrylamide and acrylate co-polymer.

4. The method according to claim 1, wherein the liquid binder comprises glycerol.

5. The method according to claim 1, wherein at least a portion of an exterior surface of each of the self-suspending proppant particles comprises the second water-absorbing polymer in powdered foul'.

6. The method according to claim 1, wherein the molecular weight of the second water-absorbing polymer is different than the molecular weight of the first water-absorbing polymer.

7. The method according to claim 1, wherein the first water-absorbing polymer is about 30 mol. % anionic.

8. The method according to claim 1, wherein the second water-absorbing polymer is about 30 mol. % anionic or about 40 mol. % anionic.

9. The method according to claim 1, further comprising adding a flowing agent to the self-suspending proppant particles.

10. The method according to claim 9, wherein the flowing agent comprises a sodium aluminosilicate.

11. The method according to claim 1, wherein the drying comprises exposing the polymer-coated substrate particles to heat.

12. The method according to claim 1, wherein the second water-absorbing polymer is powdered prior to the coating at least a portion of the intermediate polymer-coated substrate particles with the second water-absorbing polymer.

13. The method according to claim 1, wherein the first water-absorbing polymer is about 40 mol. % anionic.

14. The method according to claim 1, wherein the second water-absorbing polymer is about 30 mol. % anionic.

15. The method according to claim 1, wherein the second water-absorbing polymer is about 40 mol. % anionic.

* * * * *